US012589267B2

(12) United States Patent
Jung et al.

(10) Patent No.: US 12,589,267 B2
(45) Date of Patent: Mar. 31, 2026

(54) ADSORPTION FILTER STRUCTURE OR PURIFICATION MODULE AND HELMET COMPRISING THE SAME

(71) Applicant: AGENCY FOR DEFENSE DEVELOPMENT, Daejeon (KR)

(72) Inventors: Heesoo Jung, Daejeon (KR); Min-Kun Kim, Daejeon (KR); Jaeheon Lee, Daejeon (KR)

(73) Assignee: Agency for Defense Development, Daejeon (KR)

( * ) Notice: Subject to any disclaimer, the term of this patent is extended or adjusted under 35 U.S.C. 154(b) by 1141 days.

(21) Appl. No.: 17/552,031

(22) Filed: Dec. 15, 2021

(65) Prior Publication Data

US 2022/0193467 A1      Jun. 23, 2022

(30) Foreign Application Priority Data

Dec. 17, 2020      (KR) ........................ 10-2020-0177483

(51) Int. Cl.
| | |
|---|---|
| *A62B 23/02* | (2006.01) |
| *A42B 3/28* | (2006.01) |
| *A62B 18/04* | (2006.01) |
| *B01D 46/00* | (2022.01) |
| *B01D 46/52* | (2006.01) |
| *B01D 46/54* | (2006.01) |

(52) U.S. Cl.
CPC ................ *A62B 23/02* (2013.01); *A42B 3/28* (2013.01); *A62B 18/045* (2013.01); *B01D 46/0036* (2013.01); *B01D 46/0087* (2013.01); *B01D 46/521* (2013.01); *B01D 46/543* (2013.01); *B01D 2275/10* (2013.01)

(58) Field of Classification Search
CPC .. A62B 3/28; A62B 3/281; A62B 7/10; A62B 18/045; A62B 19/00; A62B 23/02; A62B 23/025; B01D 50/00
See application file for complete search history.

(56) References Cited

U.S. PATENT DOCUMENTS

| | | | | | |
|---|---|---|---|---|---|
| 4,826,513 | A | * | 5/1989 | Stackhouse | ............ B01D 50/00 96/131 |
| 2003/0183233 | A1 | * | 10/2003 | Chang | .................... A62B 23/02 128/205.29 |
| 2006/0283453 | A1 | * | 12/2006 | Haddad | .................. A62B 23/02 128/206.16 |

FOREIGN PATENT DOCUMENTS

| | | |
|---|---|---|
| JP | 2000136422 A | 5/2000 |
| JP | 2005325461 A | 11/2005 |
| JP | 2015504001 A | 2/2015 |
| KR | 20090105277 A | 10/2009 |
| KR | 20150115154 A | 10/2015 |

(Continued)

*Primary Examiner* — Joseph D. Boecker
*Assistant Examiner* — Jaeick Jang
(74) *Attorney, Agent, or Firm* — NIXON PEABODY LLP

(57) ABSTRACT

An absorption filter structure with increased filter efficiency in an easily detachable form for optional use with a helmet structure. The absorption filter structure includes a filtration unit to pass external air through an internal space in a filtration direction. An absorption layer, a filtering layer and a shielding layer are stacked in the filtration unit. For filtering the external air, an external air vent, and an internal air vent are also provided. When combined with a helmet, the absorption filter structure is configured to be easily detachable from the helmet.

21 Claims, 26 Drawing Sheets

(56)  References Cited

FOREIGN PATENT DOCUMENTS

KR          101956156  B1      3/2019

* cited by examiner

200

100

300

【FIG. 2】
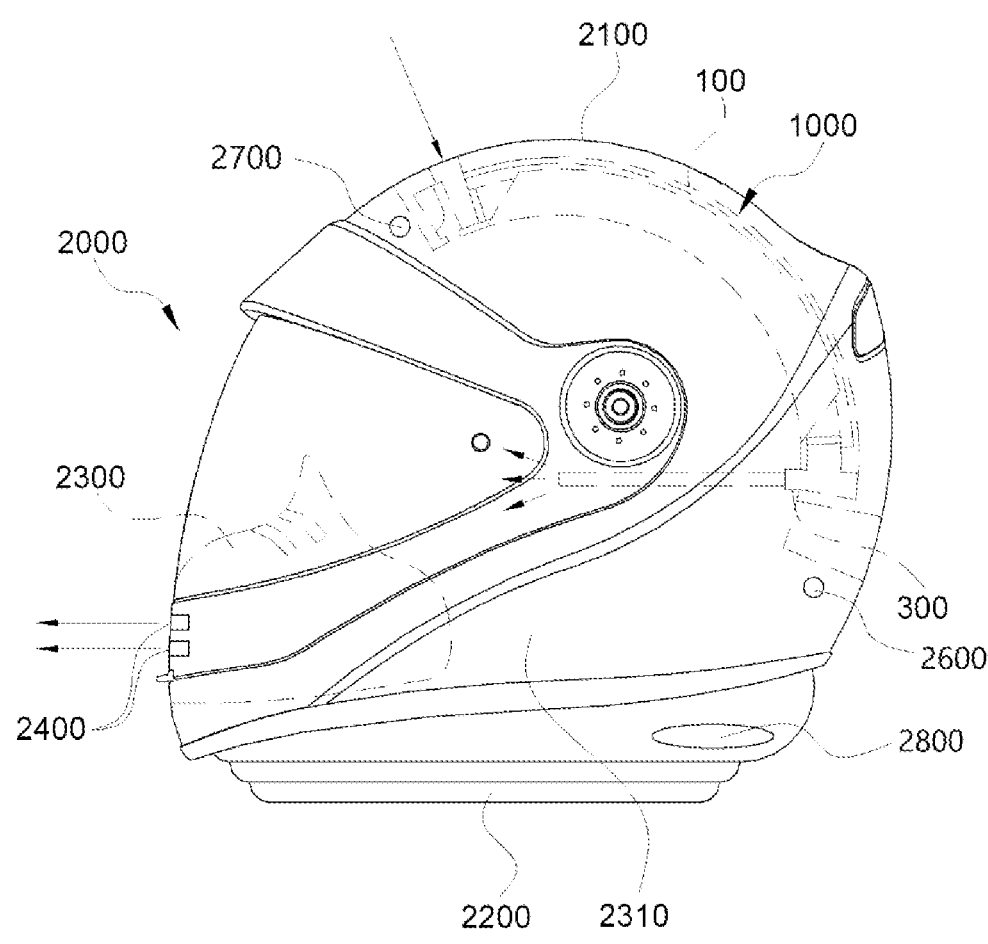

【FIG. 3A】
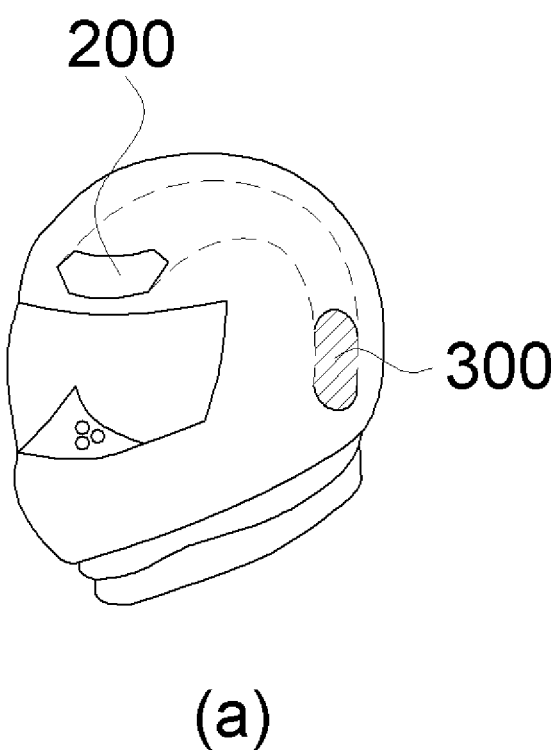
(a)

【FIG. 3B】
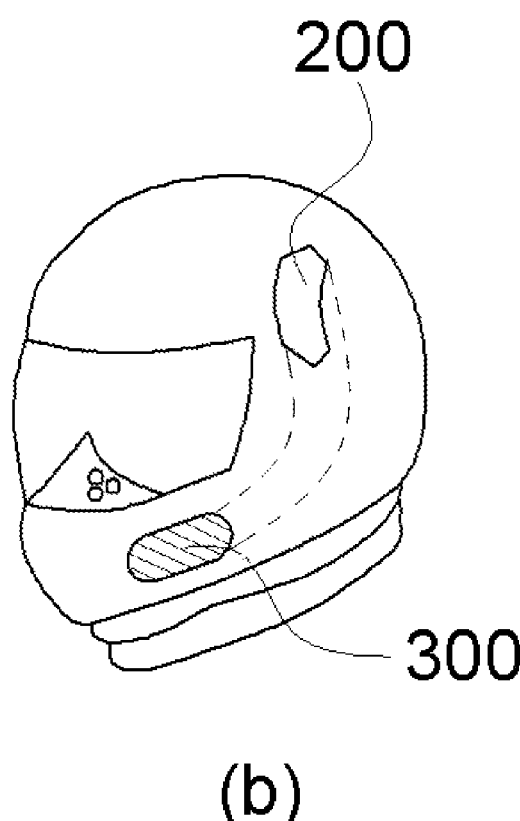
(b)

【FIG. 3C】
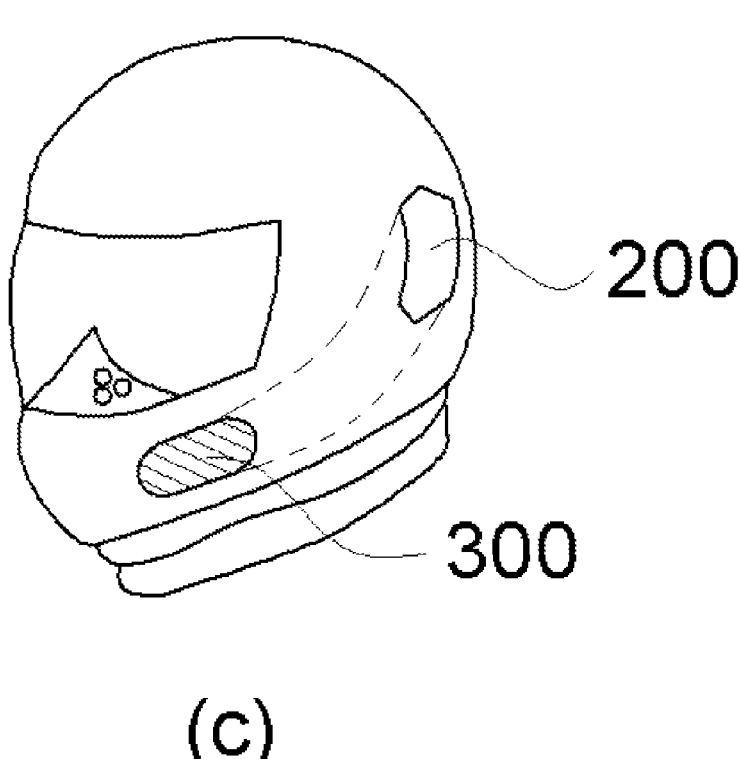
(c)

【FIG. 3D】
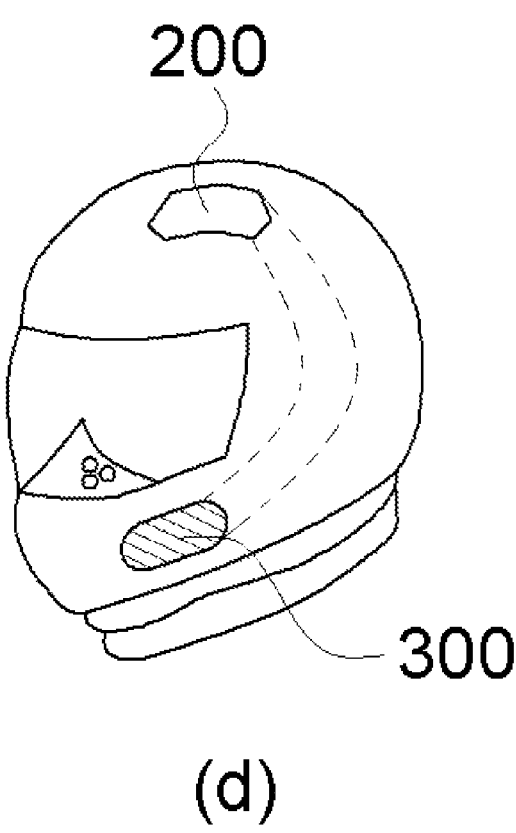
(d)

【FIG. 3E】
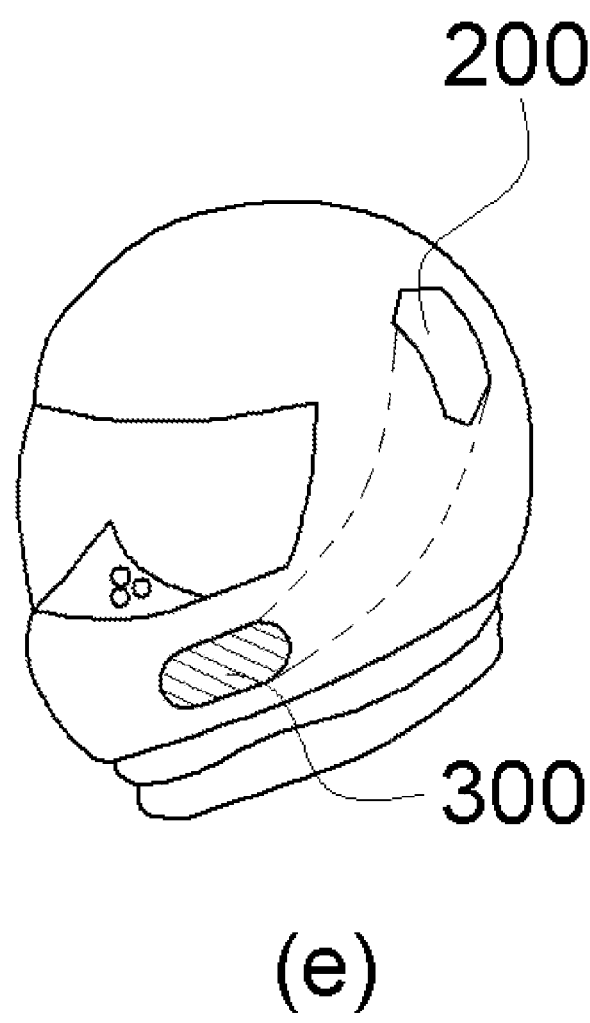
(e)

【FIG. 3F】
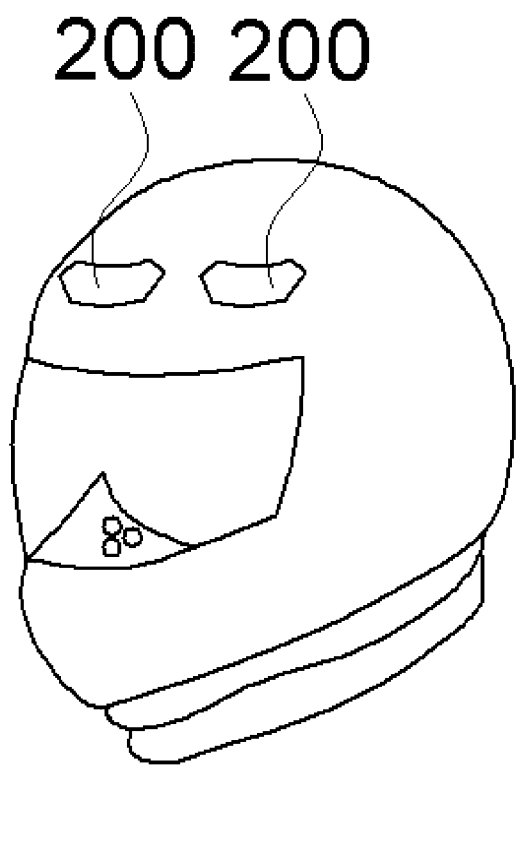
(f)

【FIG. 4A】
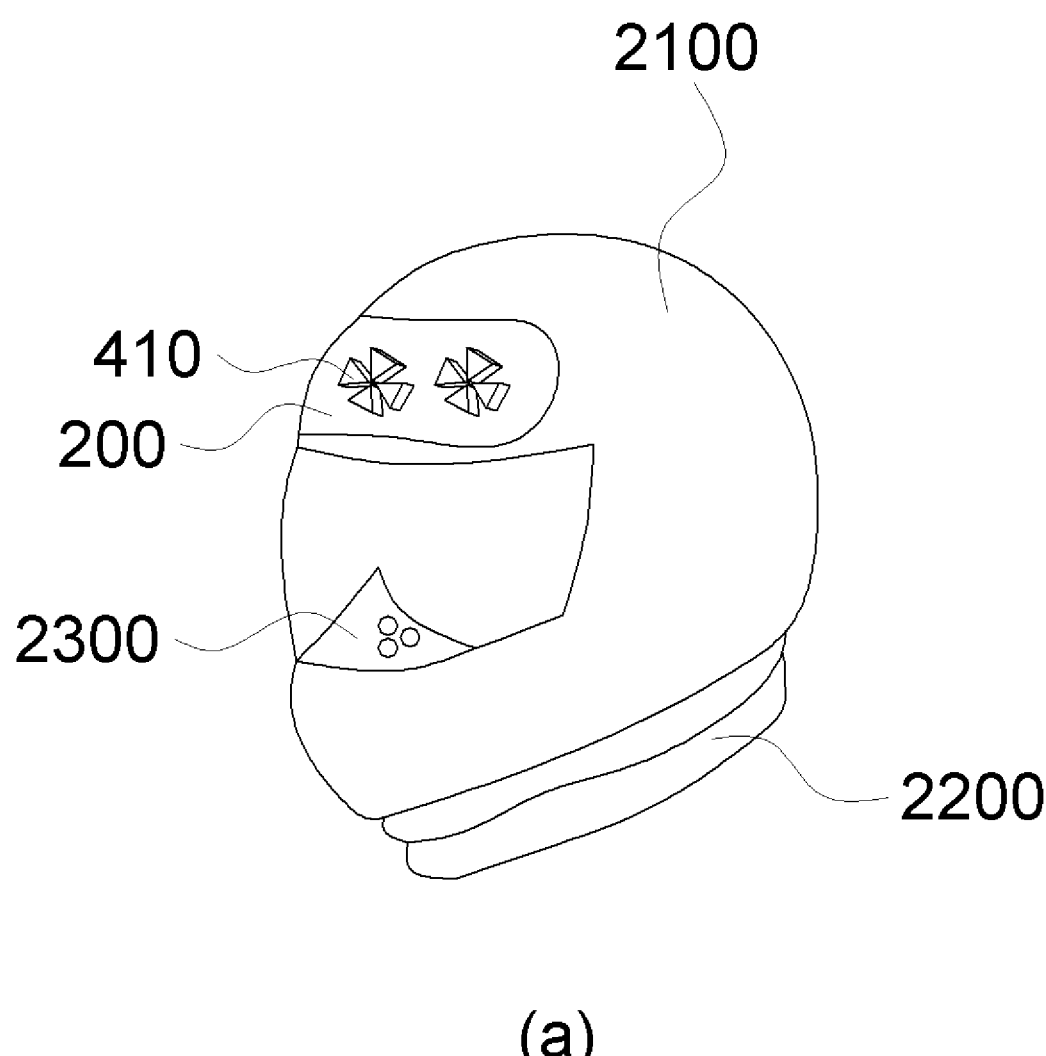
(a)

【FIG. 4B】
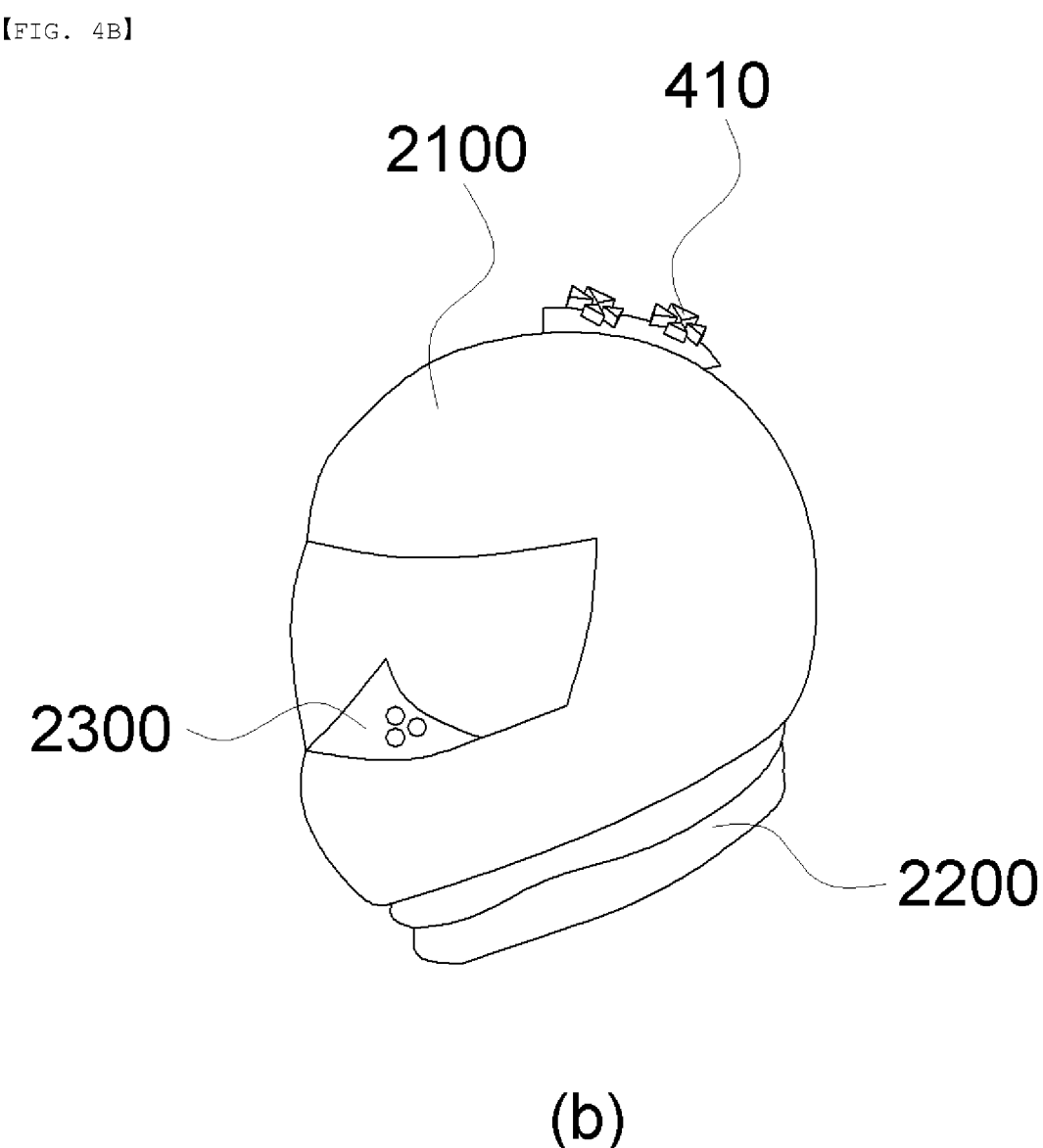
(b)

【FIG. 4C】
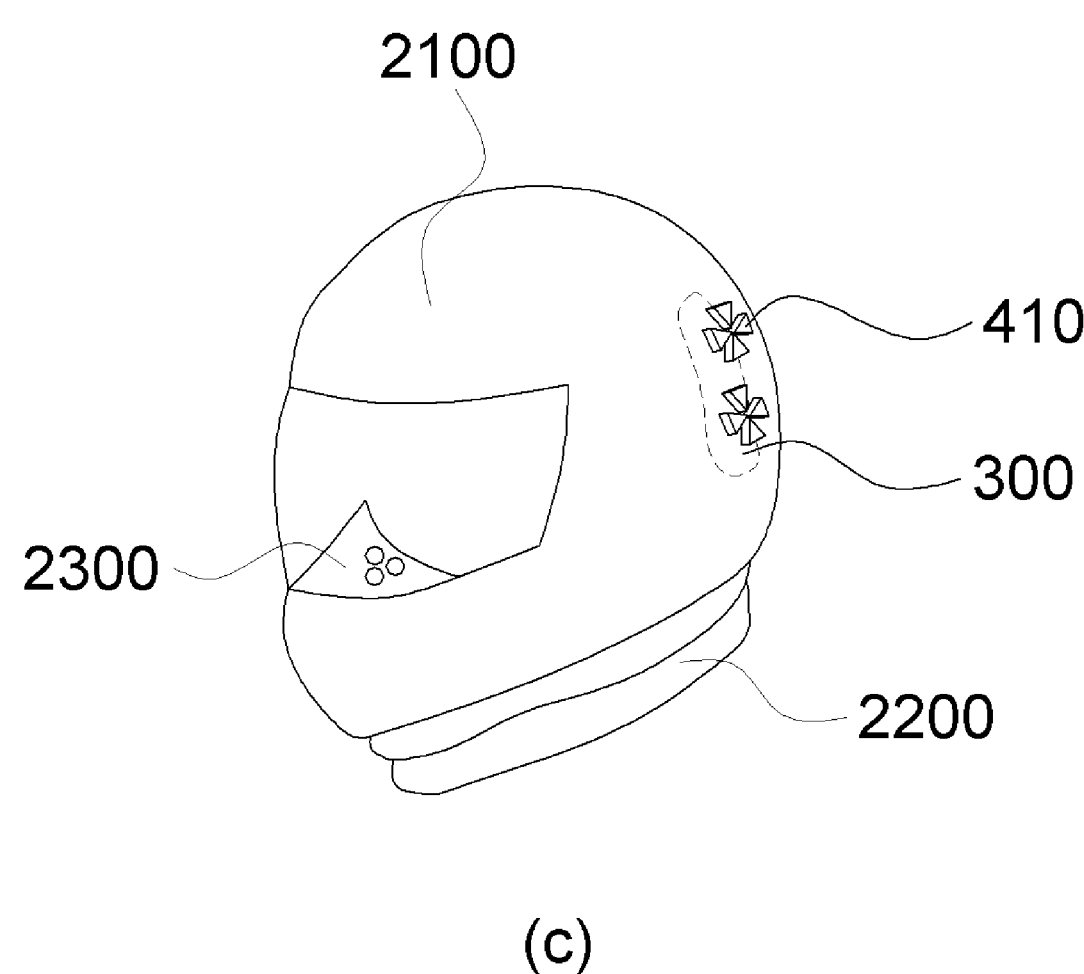
(c)

【FIG. 5】
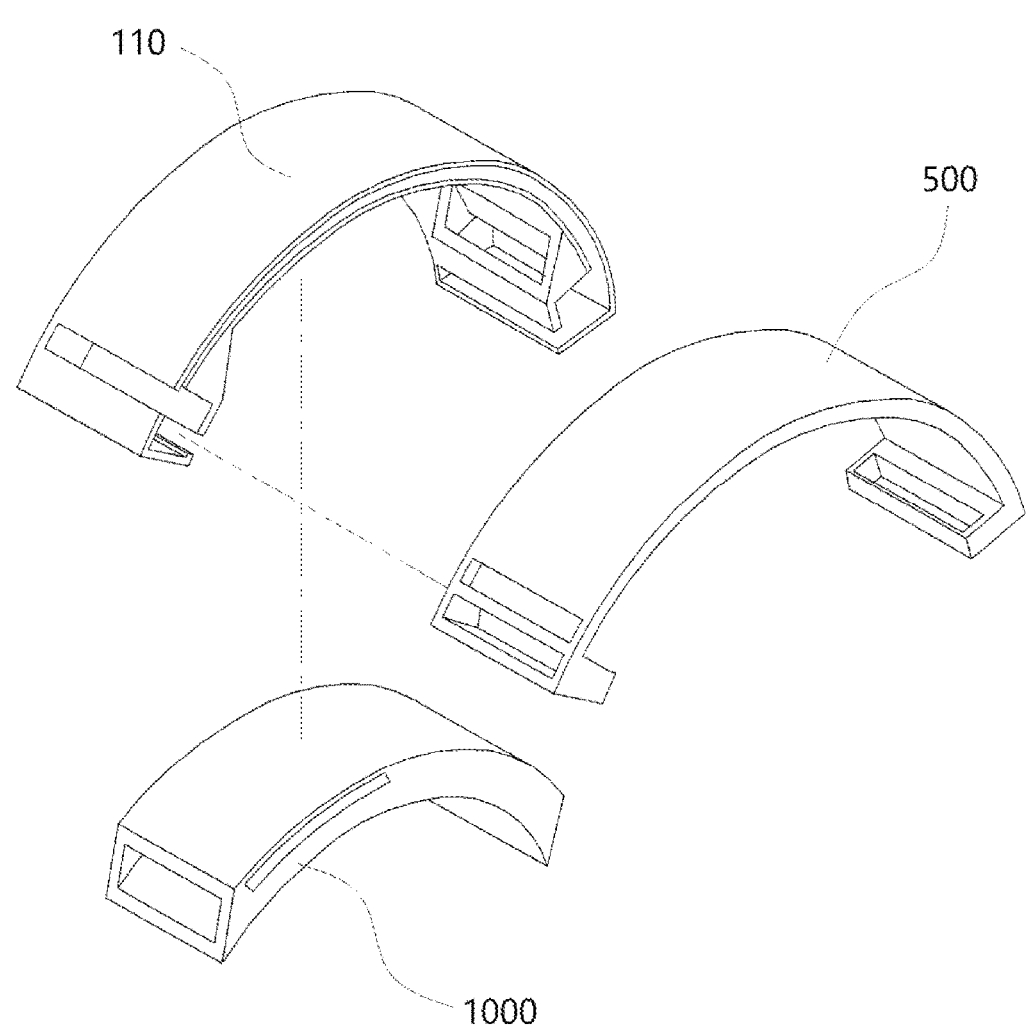

【FIG. 6A】
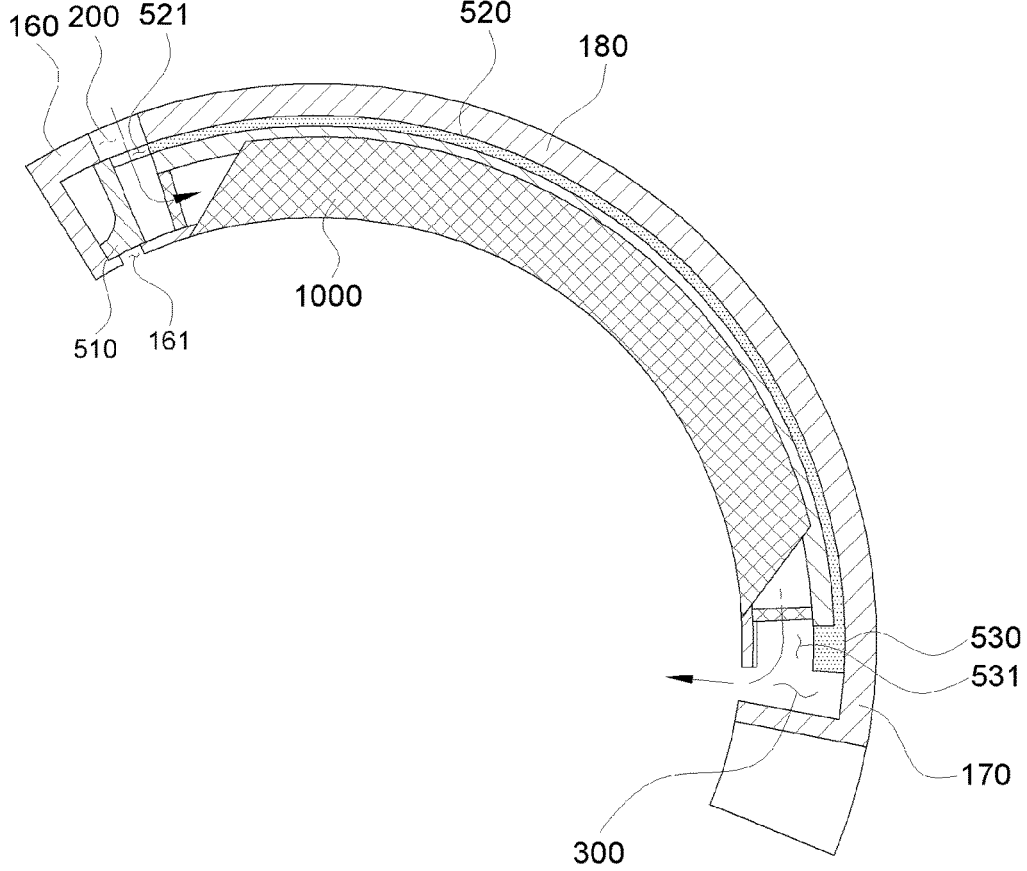

【FIG. 6B】
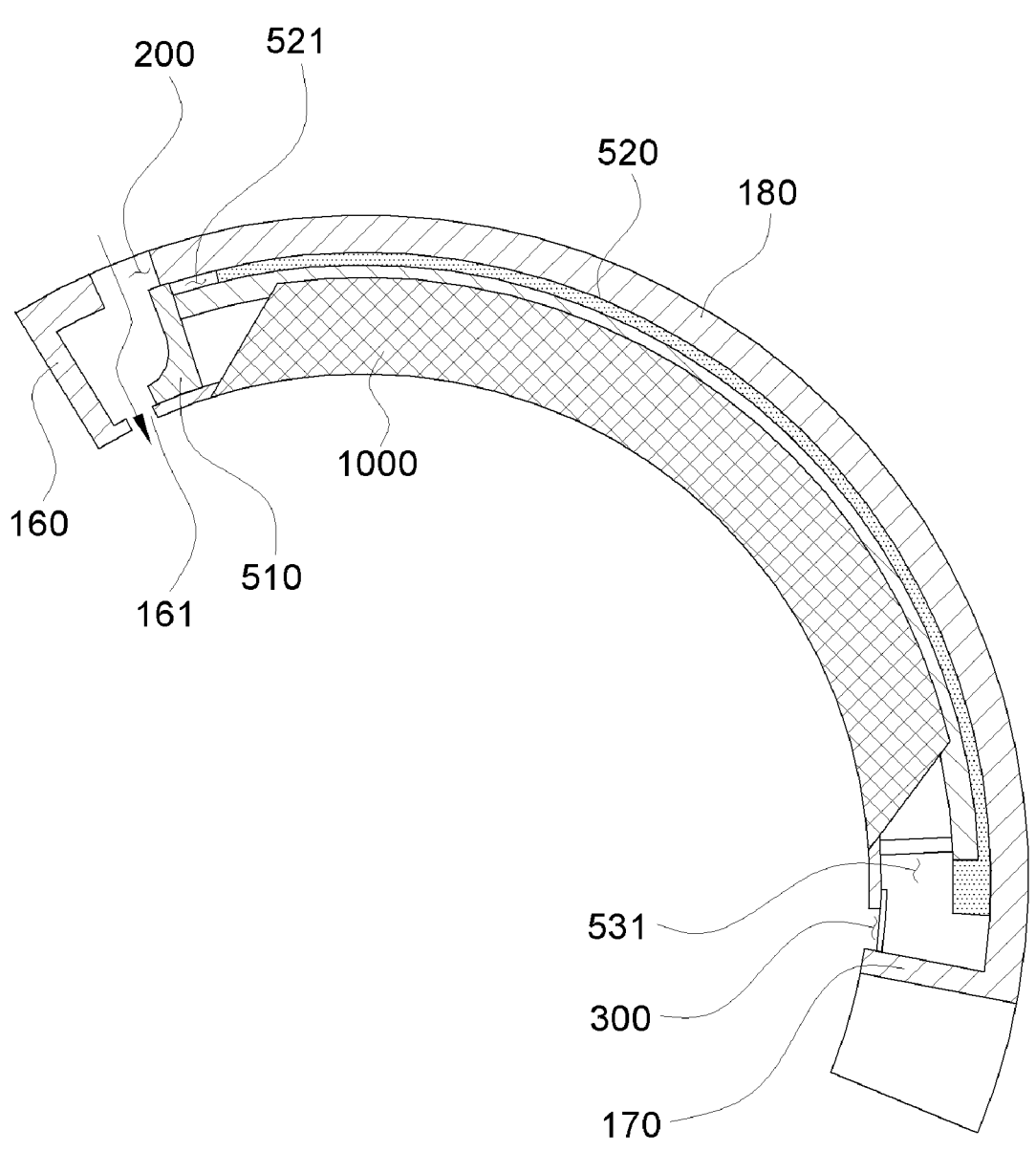

【FIG. 7A】
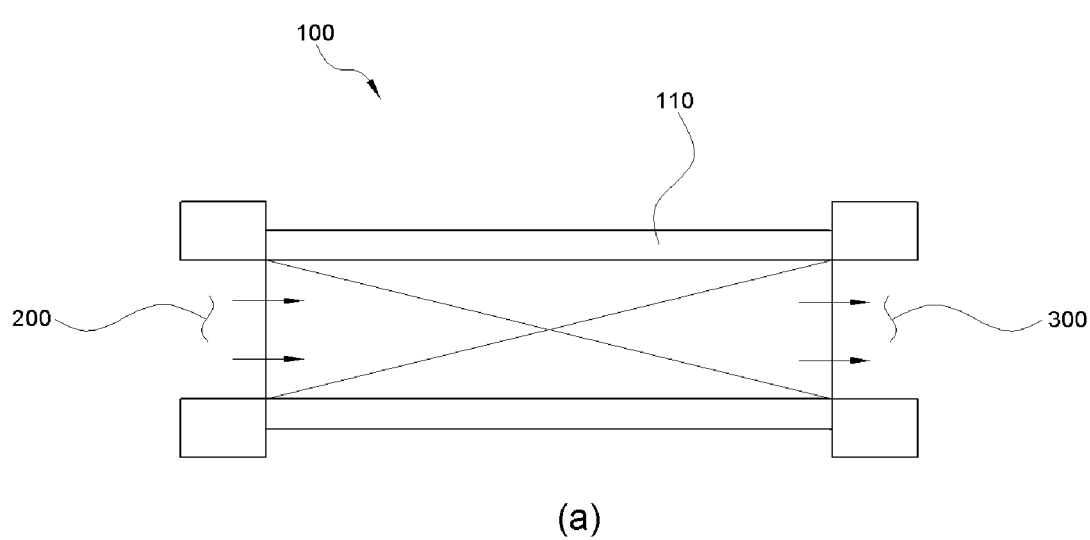
(a)

【FIG. 7B】
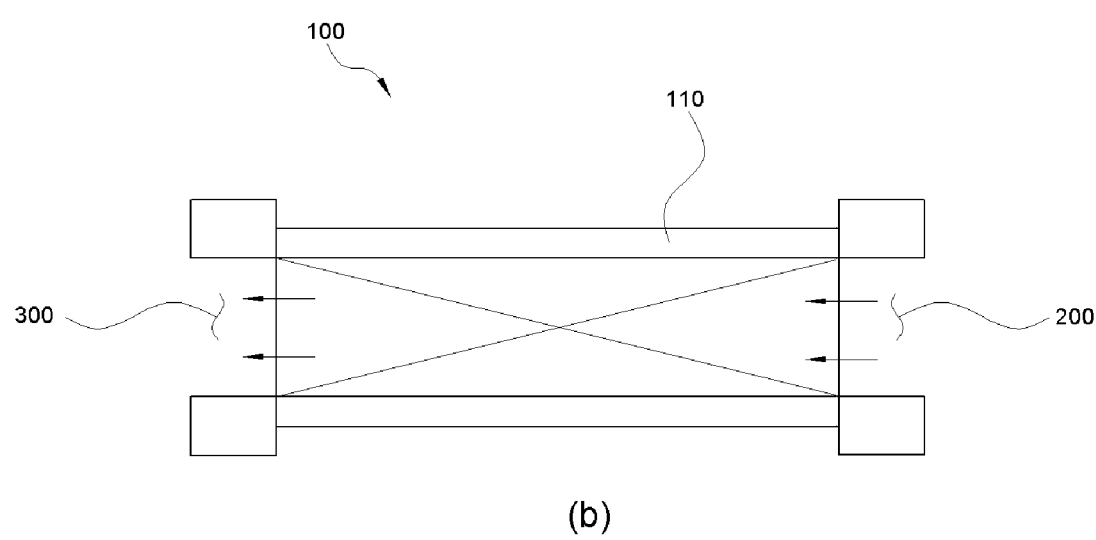
(b)

【FIG. 8】
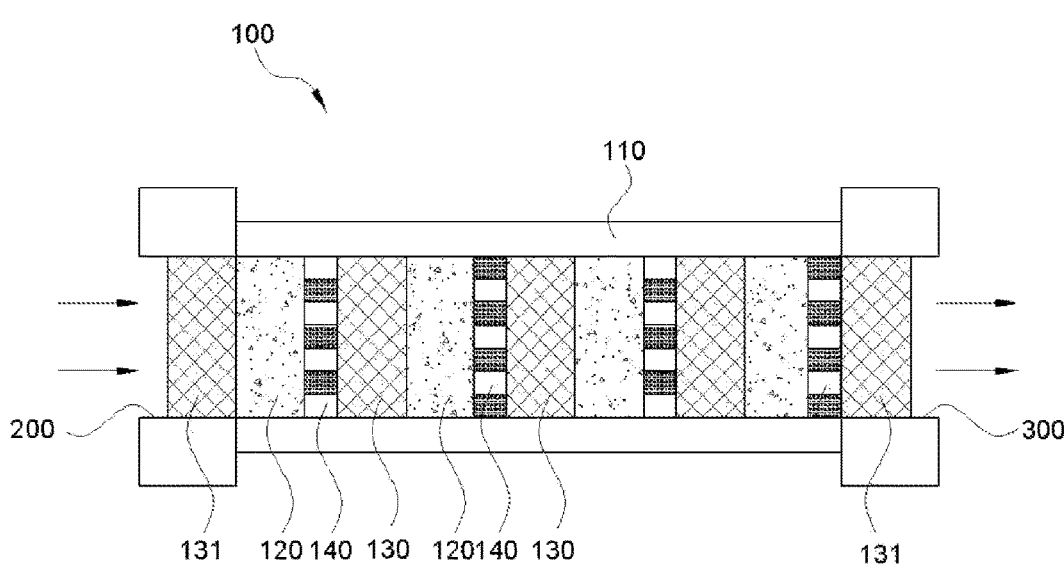

【FIG. 9】
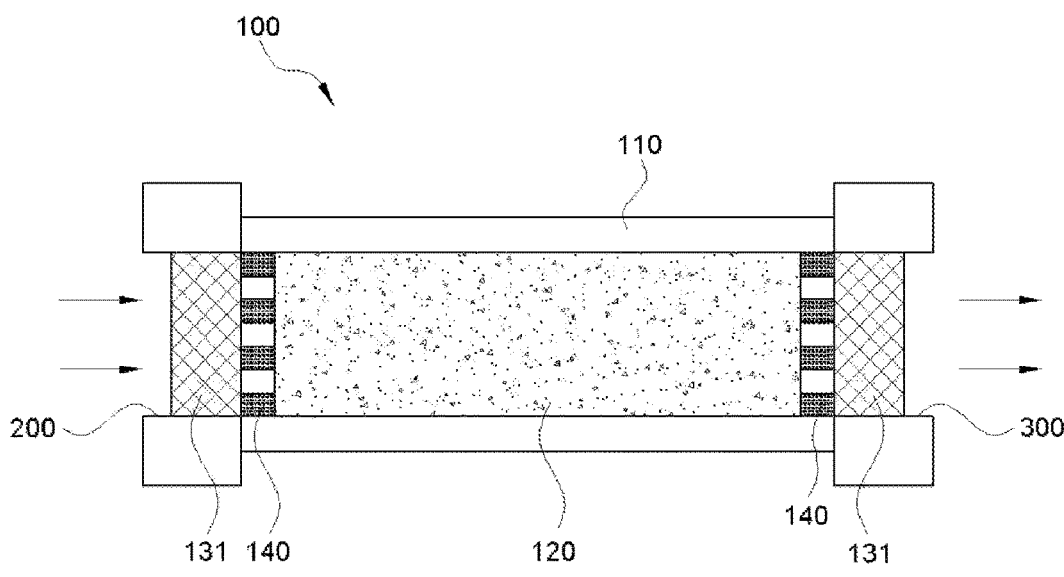

【FIG. 10】
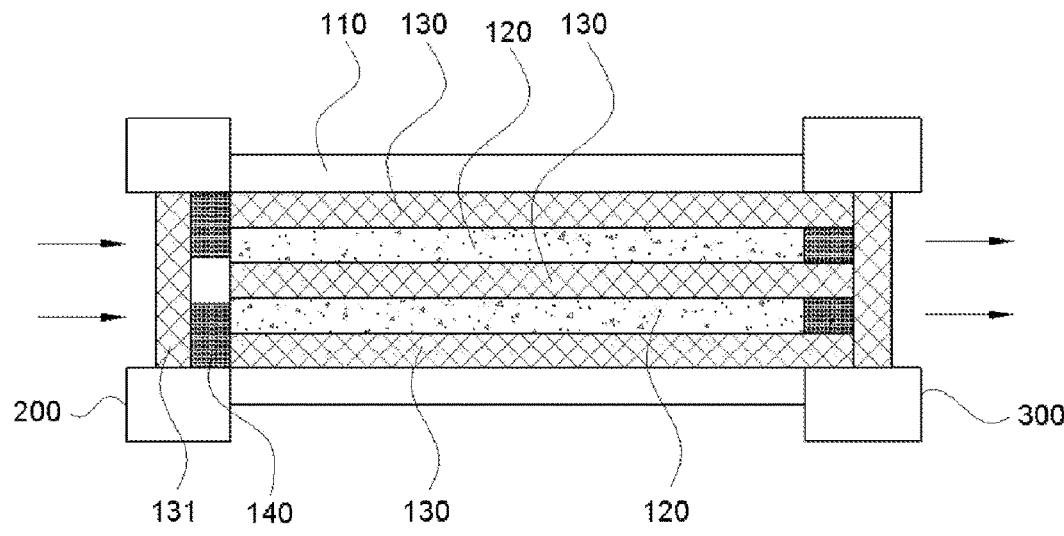

【FIG. 12】
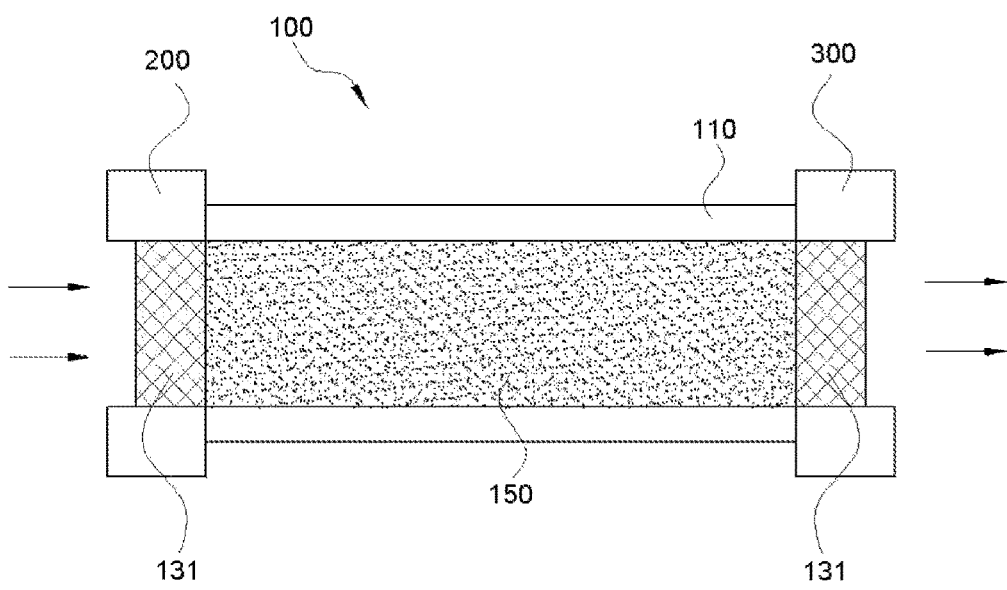

【FIG. 13】
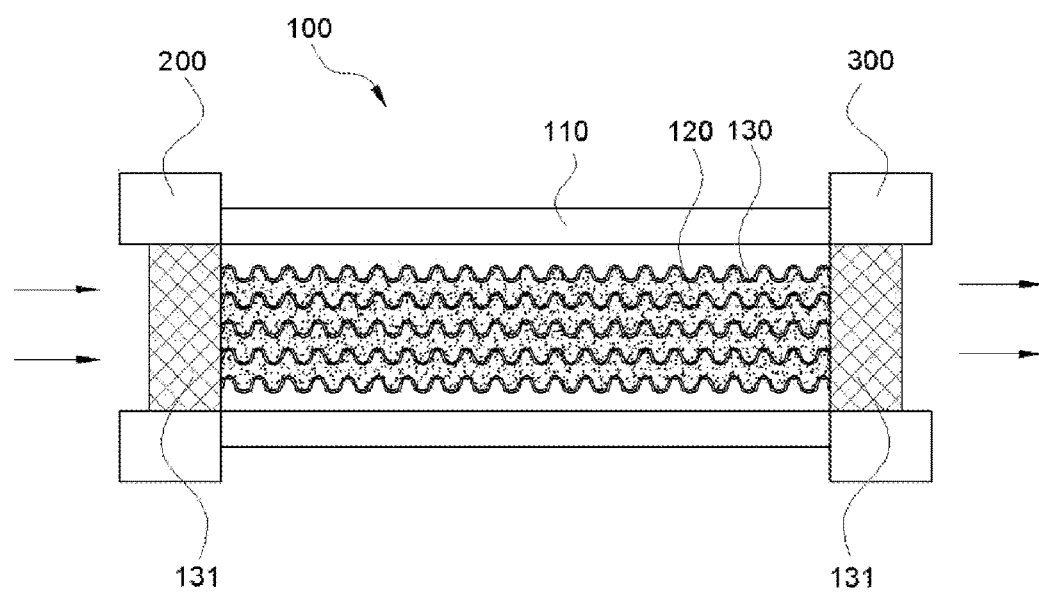

【FIG. 14】
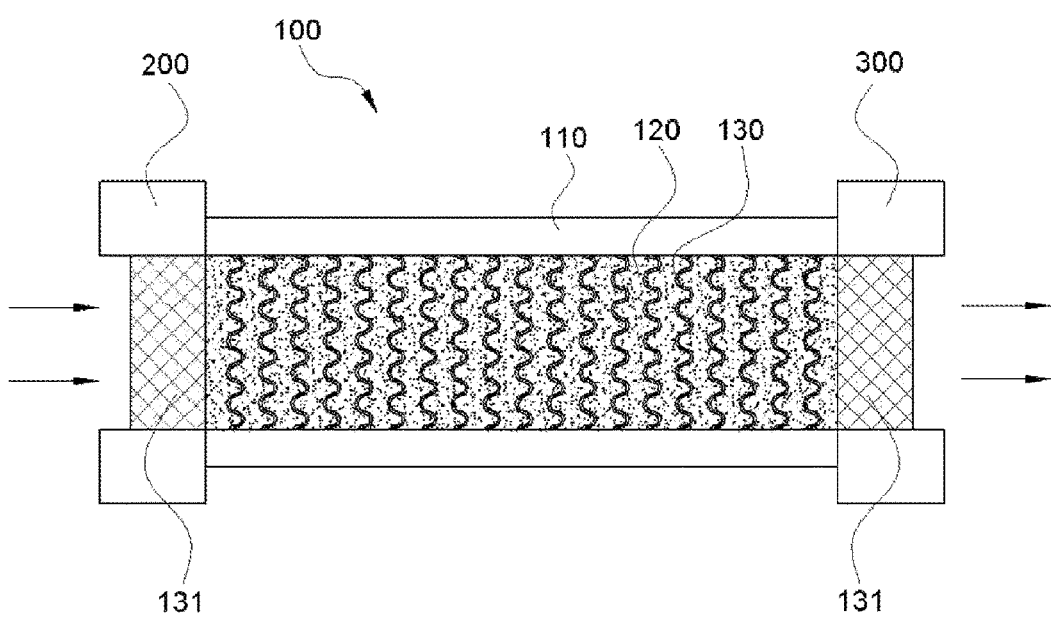

ADSORPTION FILTER STRUCTURE OR PURIFICATION MODULE AND HELMET COMPRISING THE SAME

TECHNICAL FIELD

The following disclosure relates to an adsorption filter structure, a purification module, and a helmet including the same, and more particularly, to an adsorption filter structure with easy detachment and increased filter efficiency.

BACKGROUND

In an outside work site with many risk factors, it is mandatory to wear a safety helmet to protect a worker's head from the external environment. Such a safety helmet may be made of synthetic resin to protect a user's head, but in the summer when the weather is hot, the internal temperature of the safety helmet rises sharply, causing inconvenience to the user.

In addition to this, toxic gas or dust is generated in a general work site, and there was the inconvenience of having to wear a separate mask to protect a user's respiratory organ from such a harmful environment. Recently, the occurrence of fine dust and yellow dust containing various pollutants has become more frequent. Furthermore, in the case of a military helmet, the helmet has to be connected to an adsorption layer and a filtration layer to protect the user from chemical agents, biological agents, and radioactive materials during chemical and biological control operations.

Accordingly, military gas masks and industrial gas masks respectively used in the military and civil affairs of the related art have been configured in such a way that a purification tank is in a protruding way connected to a part of a gas mask close to a facial respirator. In particular, the purification tank of the gas mask includes a gas adsorption layer that adsorbs a gaseous chemical agent or industrial toxic gas and a particle filtration layer that filters fine particles. The gas adsorption layer and the particle filtration layer have a multi-layer structure, are designed based on wearer's breathing resistance, gas adsorption capacity, and particle filtration capacity, have increased their volume according to the type, concentration, and flow rate of gas, and have to be used for a long time.

As described above, since the purification tank is coupled to the outside of the helmet or the gas mask in a protruding shape, there was a limitation in the movement of a face part or the arm, and there is a disadvantage that visibility is also limited.

Accordingly, in the case of an integrated gas mask such as a helmet-type gas mask with an embedded purification tank which has been recently studied a lot, there is an advantage in that the penetration of a conductive material is originally blocked and the above disadvantages may be supplemented. However, since the purification tank is embedded, the air that has passed through the purification tank may be introduced into the respirator even during normal times, not during operation, and thus there is a problem that the purification tank is consumed unnecessarily. In particular, when vigorous physical activity is performed, the respiration volume increases, and the respiratory resistance through the purification tank also increases, which caused a problem in making it difficult to breathe smoothly.

PRIOR TECHNICAL DOCUMENT

Patent Document (Patent Document 1) Korean Patent No. 10-1956156 "Safety Helmet with Complex Function"

SUMMARY

Technical Problem

An exemplary embodiment of the present disclosure is directed to providing a helmet including an adsorption filter structure designed to be easily detached without protrusion so that a wearer's field of vision is secured, wherein the adsorption filter structure that is not restricted in actions during work and a purification module in which a flow path varies according to an external environment are applied to the helmet.

Another exemplary embodiment of the present disclosure is directed to providing an adsorption filter structure with high filtration efficiency in which an adsorption layer and a filtration layer are stacked therein so as to exhibit optimal efficiency.

Another exemplary embodiment of the present disclosure is directed to providing an adsorption filter structure with maximized filtration efficiency by further including a shielding layer therein so that the time the adsorption layer and the filtration layer are in contact with air is increased.

Another exemplary embodiment of the present disclosure is directed to providing an adsorption filter structure with maximized filtration efficiency according to a user's breathing condition by interacting with a powered air purifying respirator (PAPR) including a powered fan to facilitate the circulation of filtered air.

Technical Solution

In one general aspect, an adsorption filter structure includes a filtration unit including an internal space, passing external air through the internal space in a filtration direction, and filtering the external air; an external vent communicatively connected to the internal space of the filtration unit, coupled to one side of the filtration unit, and receiving the external air; and an internal vent communicatively connected to the internal space of the filtration unit, coupled to the other side of the filtration unit, and supplying the air filtered by the filtration unit to an inside.

In addition, the external vent and the internal vent may be detachably coupled to the filtration unit.

In addition, the external vent and the internal vent may be coupled to each other so that the internal space of the filtration unit is opened in the filtration direction.

In addition, the filtration unit may include a case unit surrounding and supporting an outer surface of the internal space, at least one adsorption layer of a predetermined thickness that adsorbs a contaminant of the internal space; and at least one filtration layer of a predetermined thickness that filters the contaminant.

In addition, the filtration unit may further include an end filtration layer stacked on both ends connected to the external vent and the internal vent by a predetermined thickness.

In addition, the filtration unit may further include, in the internal space of the filtration unit, a plate-shaped shielding layer in which a hole is formed.

In addition, the adsorption layer, the filtration layer, and the shielding layer are alternately stacked in the filtration direction in the internal space of the filtration unit.

In addition, in the internal space of the filtration unit, the shielding layer may be stacked so as to be in surface contact with each of the end filtration layers, and the adsorption layer may be filled in the internal space of the filtration unit excluding the end filtration layer and the shielding layer.

In addition, in the internal space of the filtration unit, the shielding layer may be stacked so as to be in surface contact with each of the end filtration layers, the adsorption layer and the filtration layer may be alternately stacked vertically to the filtration direction in the internal space of the filtration unit excluding the end filtration layer and the shielding layer, and the shielding layer may correspond to a part in contact with the filtration layer so that the hole is formed.

In addition, in the internal space of the filtration unit, a first adsorption layer may be stacked so as to be in surface contact with each of the end filtration layers, a first shielding layer may be stacked so as to be in surface contact with each of the first adsorption layers, a second adsorption layer and the filtration layer may be alternately stacked vertically to the filtration direction in the internal space of the filtration unit excluding the end filtration layer, the first adsorption layer, and the first shielding layer, and at least one second shielding layer in a direction parallel to the first shielding layer may be stacked so as to vertically penetrate the second adsorption layer and the filtration layer.

In addition, in the internal space of the filtration unit, an adsorption-filtration composite layer in which the adsorption layer and the filtration layer are mixed may be filled.

In addition, in the internal space of the filtration unit, the adsorption layer and the filtration layer may be alternately stacked vertically to the filtration direction, and a plurality of filtration layers in a shape of membrane in which a plurality of wrinkles are formed vertically to the filtration direction may be stacked, and the adsorption layer may be filled between each of the filtration layers.

In addition, in the internal space of the filtration unit, the adsorption layer and the filtration layer may be alternately stacked horizontally to the filtration direction, and the plurality of filtration layers in a shape of membrane in which a plurality of wrinkles are formed horizontally to the filtration direction may be stacked, and the adsorption layer may be filled between each of the filtration layers.

In addition, a purification module includes a case unit including a distal portion and a proximal portion extending to one side, and in which a flow path is formed between the distal portion and the proximal portion; and a slide unit disposed inside the case unit and sliding in a longitudinal direction of the case unit, wherein the case unit includes a first end portion disposed on one side of the case unit, including the external vent in the distal portion, and in which a second hole is formed in the proximal portion; a second end portion disposed on the other side of the case unit and including the internal vent in the proximal portion; and a connection unit connecting the first end portion and the second end portion, wherein the slide unit includes a first guide opening and closing the second hole by sliding inside the first end portion; and a second guide extending from the first guide in the longitudinal direction of the case unit and sliding inside the connection unit, and wherein the second guide includes an inlet (i) communicatively connected to the external vent and opened by sliding in a direction toward the first end portion, and (ii) recessed into the connection unit and closed by sliding in a direction toward the second end portion, and the slide unit is capable of varying the flow path by sliding.

In addition, the slide unit may further include a third guide connected to the second guide and opening and closing the internal vent by sliding inside the second end portion.

In addition, the third guide may include an outlet communicatively connected to the internal vent and opened by sliding in a direction toward the first end portion, and closed by an inner wall of the second end portion by sliding in a direction away from the first end portion.

In addition, the adsorption filter structure may be disposed on one side of the case unit and is communicatively connected to the flow path of the case unit to filter air.

In addition, as the flow path varies, the flow path may be formed to pass through the adsorption filter structure or not to pass through the adsorption filter structure.

In addition, the adsorption filter structure may be detachably attached to the case unit.

In addition, the case unit may be coupled to both ends of the adsorption filter structure.

In addition, the case unit may further include a sealing member provided on a surface of the case unit in contact with the adsorption filter structure to prevent air from escaping.

In addition, the purification module may further include a sliding driving unit driving the slide unit to slide in the longitudinal direction of the case unit.

In another general aspect, a helmet to which a purification module including the adsorption filter structure of the present disclosure is applied includes a protection unit in which a space into which a user's head is inserted is formed; a neck packing unit coupled to a lower end of the protection unit and made of an elastic material; a nose cast coupled to an inner side of the protection unit and a position corresponding to a user's respirator, and in which an inhalation port receiving adsorbed and filtered air from the internal vent is formed; and an exhalation port communicatively connected to the nose cast and discharging user's exhalation to an outside of the protection unit, wherein an external air entrance hole communicatively connected to the external vent and the outside of the protective unit is formed in a surface of the protective unit.

In addition, the case unit of the filtration unit may be detachably fitted to the protection unit.

In addition, the internal vent may be located in a rear of the protection unit.

In addition, the external air entrance hole may be formed in a front upper portion of the protection unit and connected to the external vent.

In addition, the internal vent may be located in a lower side portion of the protection unit.

In addition, the external air entrance hole may be formed in an upper side portion of the protection unit and connected to the external vent, and the external air entrance hole may be formed on the same side as the internal vent.

In addition, the external air entrance hole may be formed in a lower side portion of the protection unit and connected to the external vent, and the external air entrance hole may be formed on the same side as the internal vent.

In addition, the external air entrance hole may be formed in an upper part of the protection part and connected to the external vent.

In addition, the external air entrance hole may be formed in a rear part of the protection part and connected to the external vent.

In addition, two or more adsorption filter structures may be embedded.

In addition, the helmet may further include a respiration volume detection sensor detecting a respiration volume of a user wearing the helmet, and when the respiration volume detected by the respiration volume sensor decreases, may increase a flow rate of air passing through the adsorption filter structure of the purification module.

In addition, the helmet may further include a pollution detection sensor disposed on one side of the body and detecting pollution of external air of the helmet, and, when a pollution level detected by the pollution detection sensor increases, may vary the flow path so that the air flowing into the body passes through the adsorption filter structure of the purification module.

In addition, the helmet may further include a remaining life indicator indicating a replacement time of the purification module.

In addition, a powered air purifying respirator (PAPR) including a blowing fan may be mounted on at least one of the external vent, the internal vent, and the filtration unit.

Advantageous Effects

As set forth above, according to the present disclosure, the adsorption filter structure and the helmet to which the adsorption filter structure is applied include the detachable type adsorption filter structure without protrusion inside the helmet, and thus there are effects that the wearer's field of vision is secured, and the action is not restricted even during work.

In addition, there is an effect of increasing the filtration efficiency because the adsorption layer and the filtration layer are stacked inside to exhibit the optimum efficiency.

In addition, there is an effect of maximizing the filtration efficiency by further including the shielding layer inside so that the time that the adsorption layer and the filtration layer are in contact with air is increased.

In addition, in the purification module, the flow path may be switched according to the sliding driving of the slide unit.

In addition, the helmet may reduce the breathing resistance by increasing the flow rate of air passing through the purification module according to the user's breathing state.

In addition, there is an effect of maximizing the filtration efficiency by interacting with the powered air purifying respirator (PAPR) including the powered fan to facilitate the circulation of filtered air.

In addition, according to the degree of pollution of the outside air, if necessary, the flow path may be switched so that the outside air passes through the purification module, and thus the replacement cycle of the purification module may be increased.

BRIEF DESCRIPTION OF THE DRAWINGS

FIG. 2 is a cross-sectional view of an adsorption filter system of the present disclosure.

FIGS. 3A-3F is a conceptual diagram illustrating each embodiment of a position of the adsorption filter structure of the present disclosure.

FIGS. 4A-4C is a perspective view illustrating an example in which a powered air purifying respirator (PAPR) of an adsorption filter system of the present disclosure is applied.

FIG. 5 is an exploded perspective view illustrating a purification module of the present disclosure.

FIGS. 6A-6B is a cross-sectional view illustrating driving of a slide unit of the present disclosure.

FIGS. 7A-7B is a cross-sectional view of an adsorption filter structure of the present disclosure.

FIG. 8 is a cross-sectional view illustrating a first embodiment of a filtration unit.

FIG. 9 is a cross-sectional view illustrating a second embodiment of the filtration unit.

FIG. 10 is a cross-sectional view illustrating a third embodiment of the filtration unit.

FIG. 12 is a cross-sectional view illustrating a fifth embodiment of the filtration unit.

FIG. 13 is a cross-sectional view illustrating a sixth embodiment of the filtration unit.

FIG. 14 is a cross-sectional view illustrating a seventh embodiment of the filtration unit.

DETAILED DESCRIPTION OF EMBODIMENTS

Hereinafter, the technical idea of the present disclosure will be described in more detail with reference to the accompanying drawings. Prior to this, the terms or words used in the present specification and claims should not be construed as being limited to conventional or dictionary meanings, and should be interpreted as meanings and concepts consistent with the technical spirit of the present disclosure on the principle that the inventor may adequately define the concept of the terms in order to best describe his/her embodiments.

Hereinafter, the basic configuration of an absorption filter structure 1000 and a helmet 2000 to which a purification module including the absorption filter structure of the present disclosure is applied will be described with reference to FIGS. 1 to 4.

The adsorption filter structure 1000 and the purification module including the adsorption filter structure of the present disclosure shown in FIG. 1 may be embedded in the helmet 2000 to which the adsorption filter structure is applied. The adsorption filter structure 1000 may include a filtration unit 100 that passes through external air in an internal space and filters the external air in a filtration direction, an external vent 200 that is communicatively connected to the internal space of the filtration unit 100, is coupled to one side of the filtration unit 100, and receives the external air, and an internal vent 300 that is communicatively connected to the internal space of the filtration unit 100, is coupled to the other side of the filtration unit 100, and supplies the air filtered by the filtration unit 100.

Figure 1A:
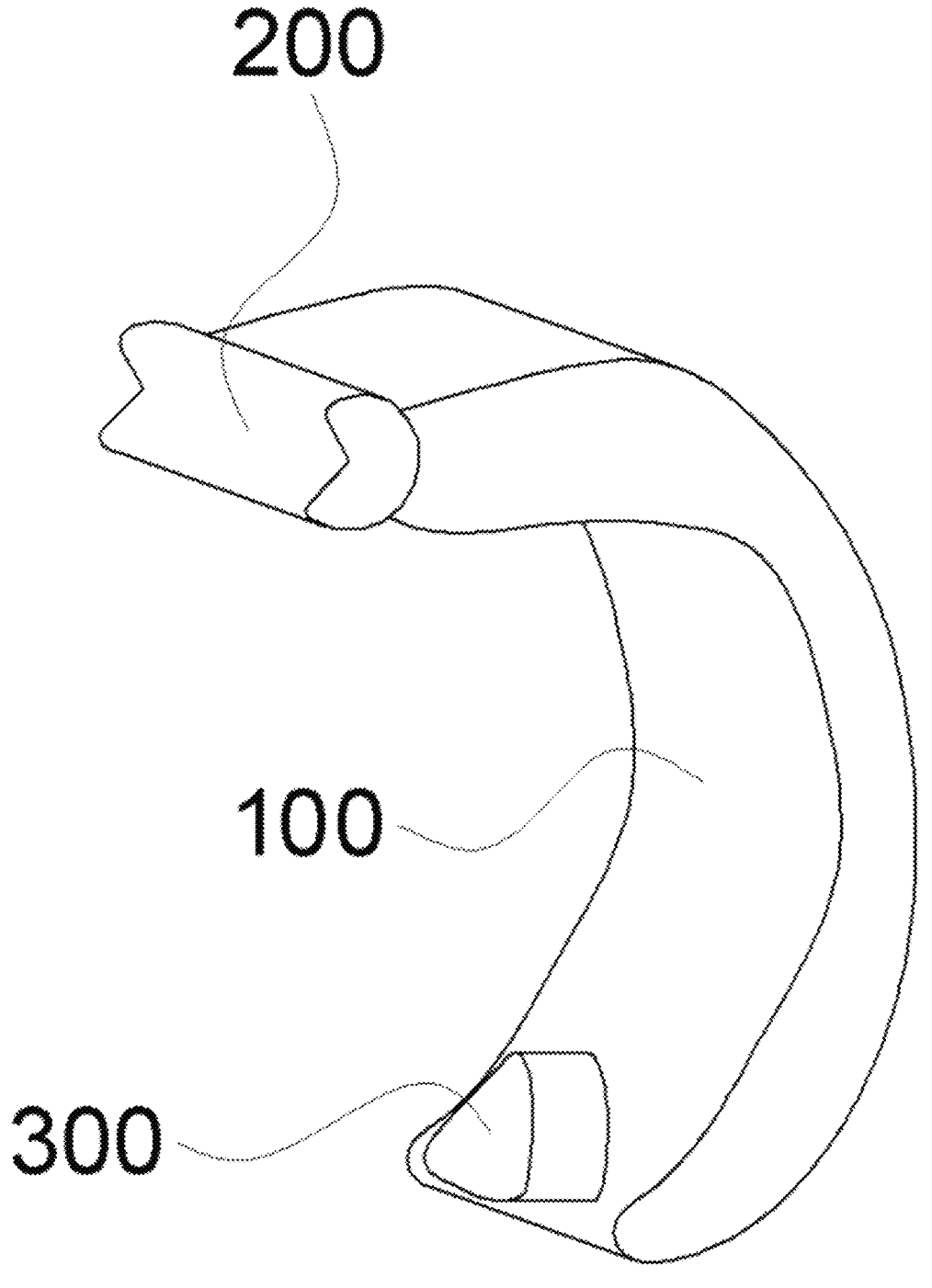
FIGS. 1A-1D are perspective views of an adsorption filter structure of the present disclosure and an embodiment thereof.

The external vent 200 and the internal vent 300 may be detachably coupled to the filtration unit 100. Accordingly, positions of the external vent 200 and the internal vent 300 may be exchanged according to a user's request, and two or more external vents 200 and internal vents 300 may be installed as needed. At this time, the external vent 200 and the internal vent 300 may be coupled such that the internal space of the filtration unit 100 is opened in the filtration direction as shown in FIG. 1(A). Accordingly, the filtered air may be allowed to flow in a straight line, which may reduce friction and thus, the user's respiration volume may be improved.

Figure 1B:
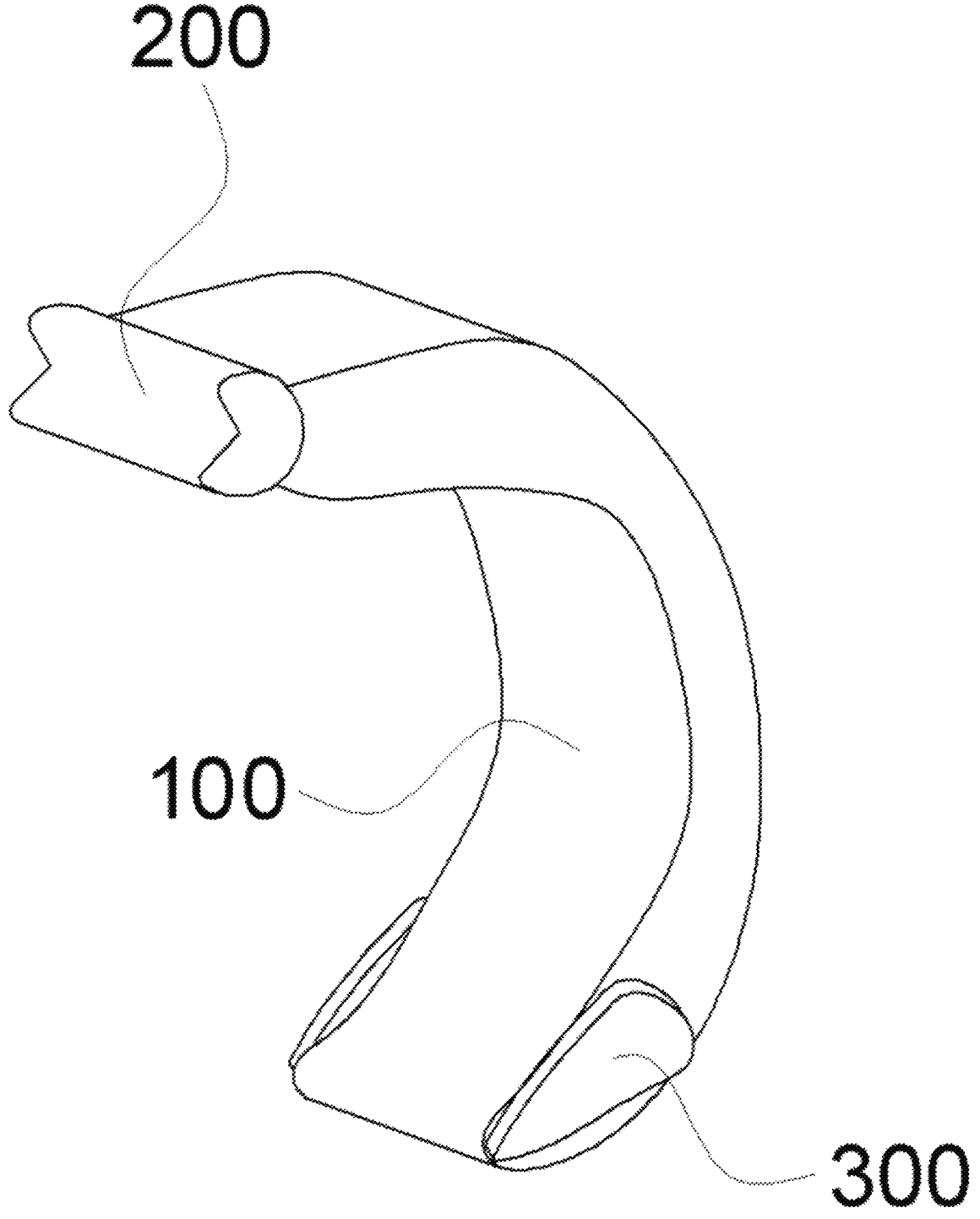

Alternatively, any one of the external vent 200 and the internal vent 300 may be coupled to a side surface of the filtration unit 100 as shown in FIG. 1(B). Accordingly, even if an angular phase difference between the external vent 200 and the internal vent 300 occurs when coupled to a protection unit 2100, the filtration unit 100 may not be twisted.

Figure 1C:
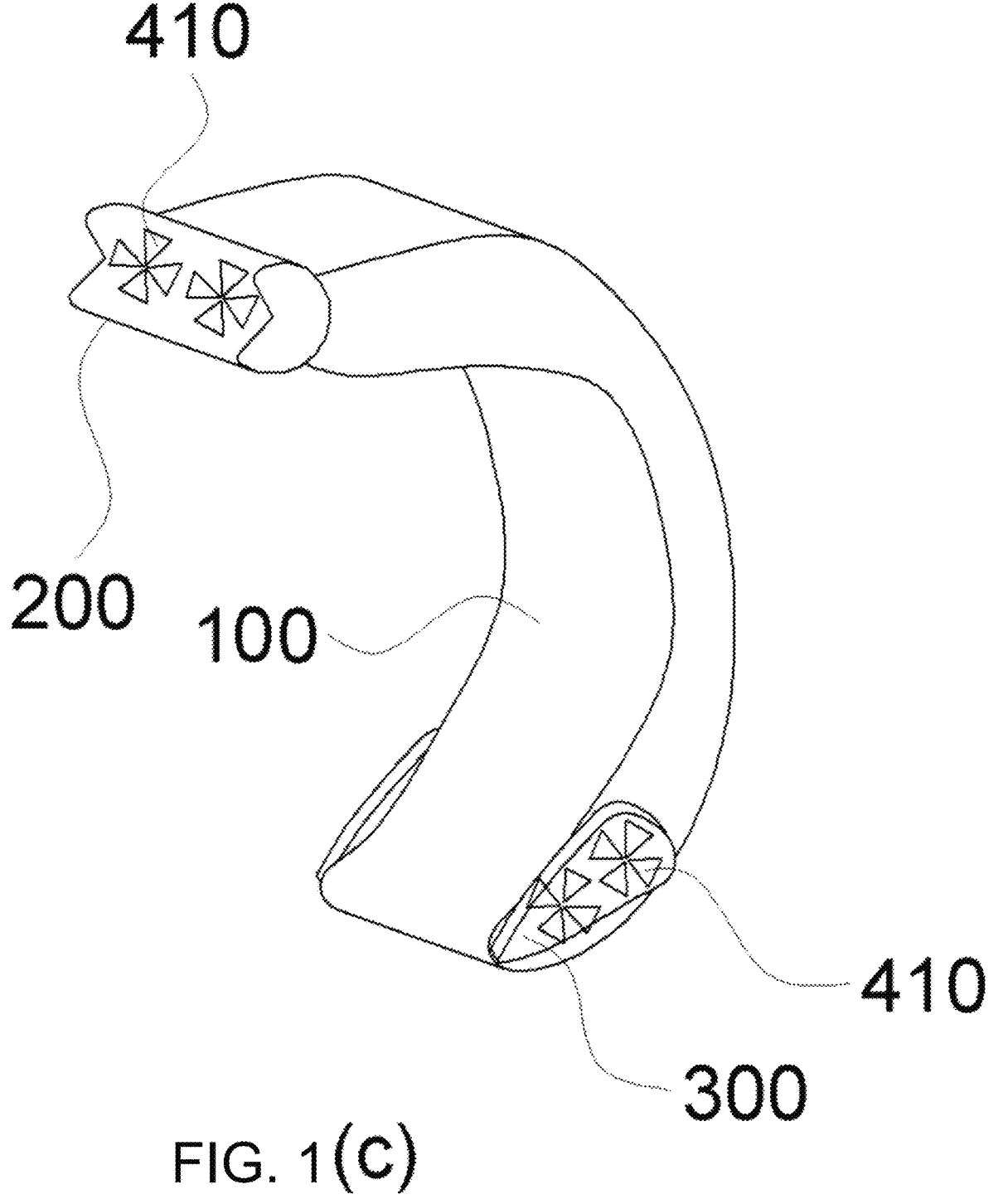
Figure 1D:
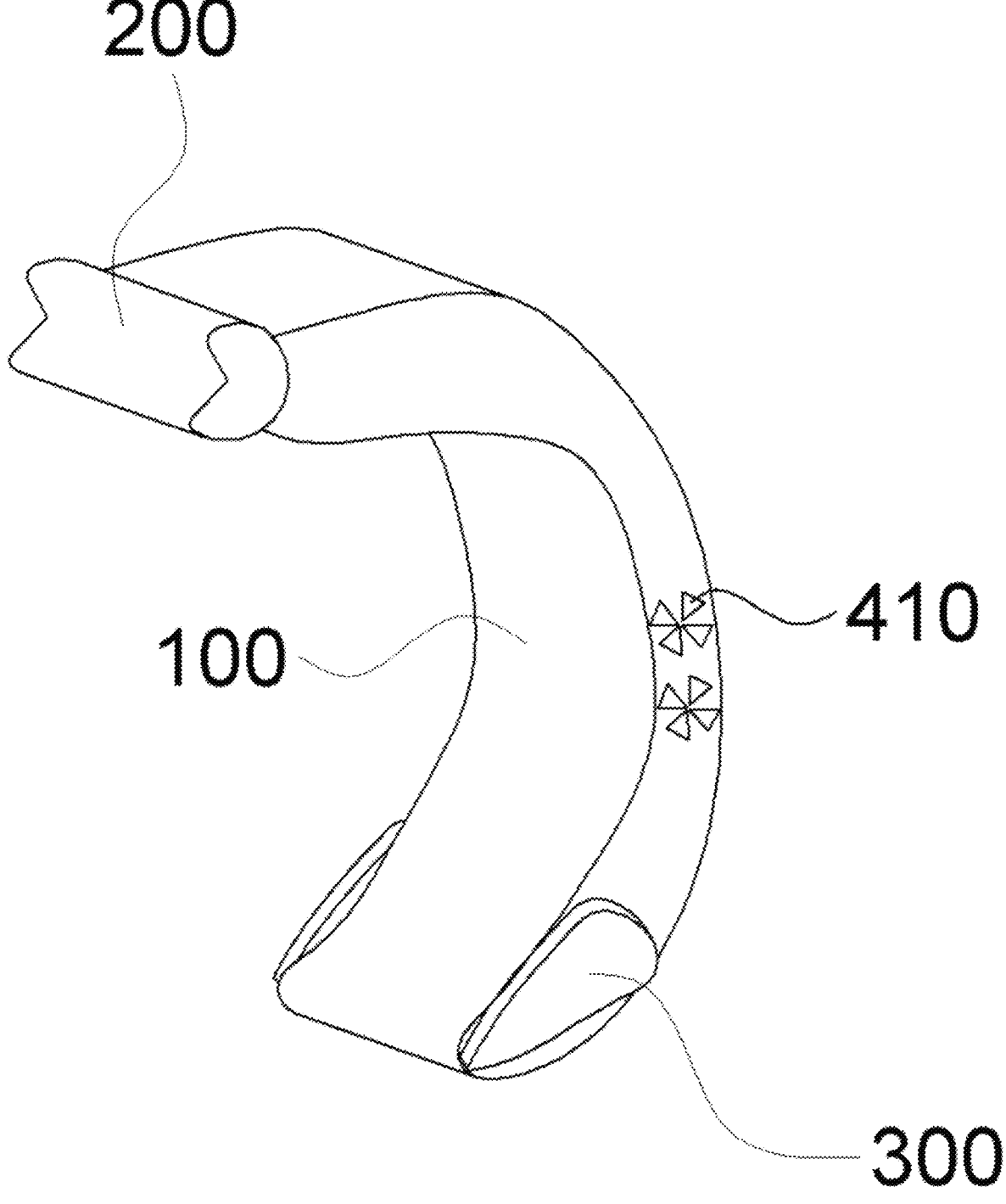

In addition, as shown in FIGS. 1(C) to 1(D), a blowing fan 410 may be mounted to at least one of the external vent 200, the internal vent 300, and the filtration unit 100. This may be to compensate for an insufficient amount of oxygen supplied to the user when an internal structure of the adsorption filter structure 1000 is complicated so as to increase filtration and adsorption efficiency.

In more detail, a powered air purifying respirator (PAPR) 400 to which the blowing fan 410 is applied may be connected to the adsorption filter structure 1000. The PAPR 400 may include a small battery and may be attached to the outside or the inside of the helmet. FIG. 12 shows an embodiment in which the PAPR 400 is connected to the outside.

The PAPR 400 is mounted, and thus polluted external air may be smoothly transferred to the adsorption layer 120 and the filtration layer 130, and a user's breathing resistance may be reduced so that breathing may be maintained comfortably.

In the helmet 2000 to which the adsorption filter structure shown in FIG. 2 is applied, the adsorption filter structure 1000 may be embedded therein without protrusion. The helmet 2000 to which the adsorption filter structure is applied may include the protection unit 2100 having a space in which a user's head is inserted. An external air entrance hole 2500 may be formed in the protection unit 2100. The external air entrance hole 2500 may be connected to the external vent 200 of the adsorption filter structure 1000 to allow the external air of the protection unit 2100 to enter inside the filtration unit 100. The protection unit 2100 may be formed to have a greater thickness than that of normal helmet so that the absorption filter structure 1000 is inserted therein, or may be formed to have the same thickness as that of the normal helmet so that the adsorption filter structure 1000 may be sandwiched between the protection unit 2100 and the user's head. Accordingly, the absorption filter structure 1000 may be used integrally with the helmet by breaking away from the existing protruding shape of the purification tank, and thus a wearer's field of vision may be secured, and action may not be restricted even during work.

In addition, the helmet 2000 to which the absorption filter structure is applied may be coupled to a lower end of the protection unit 2100 and include a neck packing unit 2200 made of an elastic material. When the user wears the helmet 2000 to which the absorption filter structure is applied, the neck packing unit 2200 may seal the inside of the protection unit 2100 to prevent the inflow of contaminated external air from the vicinity of a user's neck. It is preferable that the neck packing unit 2200 be made of the elastic material considering that respective users have different sizes.

In addition, the helmet 2000 to which the absorption filter structure is applied may include a nose cast 2300 coupled to the inside of the protection unit 2100 and a position corresponding to the user's respirator, and having an inhalation port (not shown) connected to the internal vent 300 and an exhalation port 2400 communicatively connected to the nose cast 2300 to discharge user's exhalation to the outside of the protection unit 2100.

The nose cast 2300 is preferably in the form of wrapping the user's respirator in the form of a mask, and is preferably in a form in close contact with the user's face so that air is not sucked other than air through the internal vent 300 of the adsorption filter structure 1000 during inhalation. The nose cast 2300 may receive adsorbed and filtered air from the internal vent 300. In more detail, a nozzle may be connected to the internal vent 300 to spray the adsorbed and filtered air in the vicinity of the nose cast 2300. Accordingly, the adsorbed and filtered air may be generally transmitted to the inside of the protection unit 2100 as well as the user's respirator. As an additional embodiment, the nose cast 2300 and the internal vent 300 may be connected by a hose 2310, thereby preventing the inflow of air that is not adsorbed and filtered into the user's respirator.

In addition, the nose cast 2300 may include a stopper (not shown) that is connected to a hinge and opened only in one direction. The stopper (not shown) may be opened and closed according to the user's breathing, may be opened when the user inhales, and may be closed when the user exhales. Accordingly, when the user does not inhale the air, it is possible to prevent the internal air of the protection unit 2100 from flowing into the inside of the nose cast.

An inhalation port (not shown) of the nose cast 2300 and an exhalation port 2400 connected to the nose cast 2300 may be additionally equipped with a facility allowing air to enter only in one direction. Accordingly, the user may inhale air only through the inhalation port (not shown) during inhalation, and may exhale air only through the exhalation port 2400 during exhalation.

In addition, it is preferable to further include a pollution detection sensor disposed on one side of the body and detecting pollution of the external air of the helmet, and, when a pollution level detected by the pollution detection sensor increases, the flow path may be varied so that the air flowing into the body passes through the adsorption filter structure of the purification module, and further include a remaining life indicator indicating a replacement time of the purification module.

In addition, the adsorption filter structure 1000 may be interpolated into the inside of the protection unit 2100 in various forms according to its application. This is shown in FIGS. 3A-3F.

In the first embodiment of the position of the adsorption filter structure 1000 shown in FIG. 3(A), the external air entrance hole 2500 may be formed in a front upper portion of the protection unit 2100 and connected to the external vent, and the internal vent 300 may be located at the rear of the protection unit 2100. Accordingly, the external vent 200 and the internal vent 300 may be arranged in a shape with relatively less bending along an upper surface of the user's head, the adsorption filter structure 1000 does not interfere with the user's field of vision, thereby increasing convenience, and even if the adsorption layer 120, the filtration layer 130, or the shielding layer 140, which will be described below, are stacked on the adsorption filter structure 1000 in a multilayer structure, the air flow rate reaching the user's respirator may be increased, thereby improving the respiration volume.

In the second embodiment of the position of the adsorption filter structure 1000 shown in FIG. 3(B), the internal vent 300 may be located in a lower side portion of the protection unit 2100, and the external air entrance hole 2500 may be formed in an upper side portion of the protection unit 2100 and connected to the external vent 200, while the external air entrance hole 2500 may be formed in the same side as the internal vent 300. Accordingly, a distance between the nose cast 2300 and the internal vent 300 may be narrowed, friction when the filtered air is transferred to the user's respirator may be reduced, the external vent 200 and the internal vent 300 may be arranged in the shape with relatively less bending along a side surface of the user's head, and even if the adsorption layer 120, the filtration layer 130, or the shielding layer 140, which will be described below, are stacked on the adsorption filter structure 1000 in a multilayer structure, the air flow rate reaching the user's respirator may be increased, thereby improving the respiration volume.

In the third embodiment of the position of the adsorption filter structure 1000 shown in FIG. 3(C), the internal vent 300 may be located in the lower side portion of the protection unit 2100, and the external air entrance hole 2500 may be formed in the lower side portion of the protection unit 2100 and connected to the external vent 200, while the external air entrance hole 2500 may be formed in the same side as the internal vent 300. Accordingly, a distance between the nose cast 2300 and the internal vent 300 may be narrowed, friction when the filtered air is transferred to the user's respirator may be reduced, and space utilization may be increased, and thus the adsorption filter structure 1000 may be easily inserted even if a separation between the user's head and the protection unit 2100 is not large. Also, the external vent 200 and the internal vent 300 may be arranged in the shape with relatively less bending along an outer surface of the user's chin or neck, and even if the adsorption layer 120, the filtration layer 130, or the shielding layer 140, which will be described below, are stacked on the adsorption filter structure 1000 in a multilayer structure, the air flow rate reaching the user's respirator may be increased, thereby improving the respiration volume.

In the fourth embodiment of the position of the adsorption filter structure 1000 shown in FIG. 3(D), the internal vent 300 may be located in the lower side portion of the protection unit 2100, and the external air entrance hole 2500 may be formed in an upper part of the protection unit 2100 and connected to the external vent 200. Accordingly, a distance between the nose cast 2300 and the internal vent 300 may be narrowed, friction when the filtered air is transferred to the user's respirator may be reduced, the external vent 200 and the internal vent 300 may be arranged in the shape with relatively less bending along the side surface of the user's head, and even if the adsorption layer 120, the filtration layer 130, or the shielding layer 140, which will be described below, are stacked on the adsorption filter structure 1000 in a multilayer structure, the air flow rate reaching the user's respirator may be increased, thereby improving the respiration volume.

In the fifth embodiment of the position of the adsorption filter structure 1000 shown in FIG. 3(E), the internal vent 300 may be located in the lower side portion of the protection unit 2100, and the external air entrance hole 2500 may be formed in a rear part of the protection unit 2100 and connected to the external vent 200. Accordingly, a distance between the nose cast 2300 and the internal vent 300 may be narrowed, friction when the filtered air is transferred to the user's respirator may be reduced, the external vent 200 and the internal vent 300 may be arranged in the shape with relatively less bending along the rear surface of the user's head, chin, neck, etc., and even if the adsorption layer 120, the filtration layer 130, or the shielding layer 140, which will be described below, are stacked on the adsorption filter structure 1000 in a multilayer structure, the air flow rate reaching the user's respirator may be increased, thereby improving the respiration volume.

In the sixth embodiment of the position of the adsorption filter structure 1000 shown in FIG. 3(F), two or more adsorption filter structures 1000 may be embedded in the helmet 2000 to which the adsorption filter structure is applied. At this time, the external vent 200 of any one of the plurality of adsorption filter structures 1000 may be connected to the external air entrance hole 2500 of the protection unit 2100, and the internal vent 300 may be connected to the external vent 200 of another adsorption filter structure 1000 so that filtration of external air may be performed in multiple steps.

Alternatively, two or more external air entrance holes 2500 may be formed in the protection unit 2100, the external vent 200 of each adsorption filter structure 1000 may be connected to each external air entrance hole 2500, and each internal vent 300 may be connected to the nose cast 2300. This may be to compensate for an insufficient amount of oxygen supplied to the user when an internal structure of the adsorption filter structure 1000 is complicated so as to increase filtration and adsorption efficiency.

In addition, as shown in FIGS. 4A-4C, according to the position of the adsorption filter structure 1000 described above, the powered air purifying respirator (PAPR) 400 to which the blowing fan 410 is applied may be connected to the adsorption filter structure 1000. FIG. 4(A) shows a structure in which the blowing fan 410 is coupled to the external vent 200, FIG. 4(B) shows a structure in which the blowing fan 410 is coupled to a side surface of the filtration unit 100, and FIG. 4(c) shows a structure in which the blowing fan 410 is coupled to the internal vent 300.

FIG. 4 shows an example of the arrangement of the blowing fan 410 and the PAPR 400 when the first embodiment of the position of the adsorption filter structure 1000 is applied. Hereinafter, FIG. 4 may be equally applied to the second to sixth embodiments of the position of the adsorption filter structure 1000.

Hereinafter, a purification module including the adsorption filter structure 1000 will be described with reference to FIGS. 5 to 6A and 6B.

As shown in FIG. 5, the purification module of the present disclosure may include a case unit 110 including a distal portion and a proximal portion extending to one side, and forming a flow path between the distal portion and the proximal portion, and a slide unit 500 disposed inside the case unit 110 and sliding in the longitudinal direction of the case unit 110.

At this time, the case unit 110, as shown in FIGS. 6A-6B, may include a first end portion 160 disposed on one side of the case unit 110, including the external vent 200 in the distal portion, and a second hole 161 formed in the proximal portion, a second end portion 170 disposed on the other side of the case unit 110 and including the internal vent 300 in the proximal portion, and a connection unit 180 connecting the first end portion 160 and the second end portion 170, and the slide unit 500 may include a first guide 510 opening and closing the second hole 161 by sliding inside the first end portion 160, and a second guide 520 extending in a longitudinal direction of the case unit 110 from the first guide 510 and sliding inside the connection unit 180.

The second guide 520 may include an inlet 521, and the inlet 521 (i) may be communicatively connected to the external vent 200 and opened by sliding in a direction toward the first end portion 160 (FIG. 6(A)), and (ii) may be recessed into the connection unit 180 and closed by sliding in a direction toward the second end portion 170 (FIG. 6(B)). Accordingly, the slide unit 500 may vary the flow path of fluid passing through the inside of the case unit 110 by sliding.

In addition, it is preferable that the slide unit 500 further include a third guide 530 connected to the second guide 520 and opening and closing the internal vent 300 by sliding inside the second end portion 170. It is preferable that the third guide 530 includes an outlet 531 that (i) may be communicatively connected to the internal vent 300 and opened by sliding in the direction toward the first end portion 160, and (ii) may be closed by an inner wall of the second end portion 170 by sliding in a direction away from the first end portion 160.

At this time, it is preferable that the adsorption filter structure 1000 be disposed on one side of the case unit 110 and is communicatively connected to the flow path of the case unit 110 to filter the air.

In addition, as the flow path varies, it is preferable that the flow path be formed to pass through the adsorption filter structure 1000 or not to pass through the adsorption filter structure 1000.

In addition, the adsorption filter structure 1000 is preferably detachably attached to the case unit 110, and the case unit 110 is preferably coupled to both ends of the adsorption filter structure 1000.

In addition, it is preferable that the case unit 110 further include a sealing member provided on a surface of the case unit 110 in contact with the adsorption filter structure 1000 to prevent air from escaping. In addition, it is preferable that the case unit 110 further includes a sliding driving unit driving the slide unit 500 to slide in the longitudinal direction of the case unit 110.

Hereinafter, the filtration unit 100 will be described with reference to FIGS. 7A-7B.

As shown in FIGS. 7A-7B, the case unit 110 may serve to support a material filled in an internal space of the filtration unit 100, and prevent leakage of air passing through the filtration unit 100 without passing through the external vent 200 or the internal vent 300. The case unit 110 is preferably made of a material with low rigidity so that the case unit 110 may be easily applicable regardless of the size of the user's head.

At this time, as described above, the external vent 200 and the internal vent 300 may be detachably coupled to the filtration unit 100, positions of the external vent 200 and the internal vent 300 may be exchanged according to a user's request, and two or more external vents 200 and internal vents 300 may be installed as needed. This is shown in FIGS. 5(A) and (B). In addition, in preparation for a case where the positions of the external vent 200 and the internal vent 300 are exchanged, it is preferable that the inside of the case unit 110 be symmetrical with respect to a plane that is vertical to a filtration direction.

The overall shape of the filtration unit 100 including the case unit 110 may be designed to be parallel to the head based on a standard human body model. In this regard, the filtration unit 100 may be designed to have a surface similar to various heads using a three-dimensional surface scanner.

The filtration unit 100 may include an adsorption layer 120, a filtration layer 130, and a shielding layer 140 in an internal space. The adsorption layer 120 may perform a function of adsorbing a gaseous chemical agent or industrial toxic gas, and activated carbon, functional activated carbon, metal nonporous body, zeolite, activated clay, or a metal catalyst may be used. The adsorption layer 120 may be shaped to be easily applied to the internal space of the filtration unit 100 by 3D printing, and furthermore, the helmet.

In addition, the filtration layer 130 may be a filter such as HEPA or ULPA capable of filtering particles equal to or less than 0.1 nm to 10 μm. The filtration layer 130 may include an end filtration layer 131 stacked on both ends connected to the external vent 200 and the internal vent 300 by a predetermined thickness. The end filtration layer 131 may be applied, thereby, when external air enters and exits the filtration unit 100, minimizing stacking of foreign substances made of fine particles on the adsorption layer 120 or the shielding layer 140, and minimizing inhalation of foreign substances made of fine particles into the user's respirator.

In addition, the shielding layer 140 may be a flat plate-shaped structure in which a hole is formed. A part of the shielding layer 140 in which no hole is formed may block air from entering and exiting, and the shielding layer 140 is disposed, which may increase the time for external air to stay in the filtration unit 100, thereby maximizing adsorption efficiency of the adsorption layer 120.

The case unit 110 of the filtration unit 100, the adsorption layer 120, the filtration layer 130, and the shielding layer 140 embedded in the internal space may be formed by printing with a 3D printer.

Hereinafter, each embodiment of the internal structure of the adsorption filter structure 1000 of the present disclosure will be described with reference to FIGS. 8 to 15.

In the first embodiment of the adsorption filter structure 1000 shown in FIG. 8, the adsorption layer 120, the filtration layer 130, and the shielding layer 140 are alternately stacked in a filtration direction in the internal space of the filtration unit 100. It is preferable that external air introduced into the internal space of the filtration unit 100 pass through in the order of the filtration layer 130—the adsorption layer 120—the shielding layer 140. To describe the present structure in more detail, the external air may firstly pass through the end filtration layer 131 to filter basic foreign substances contained in the external air. Thereafter, the external air may pass through the adsorption layer 120 to adsorb the toxic gas, etc. At this time, the flow rate is reduced by the shielding layer 140 in contact with the adsorption layer 120, which may increase the time for the external air to stay in the adsorption layer 120, thereby maximizing the adsorption efficiency.

In the first embodiment of the adsorption filter structure 1000, because the adsorption layer 120, the filtration layer 130, and the shielding layer 140 are sequentially stacked in the filtration direction, there is an advantage in that it is easy to manufacture the adsorption filter structure 1000, and it is easy to adjust the overall shape of the filtration unit 100. Because the adsorption filter structure 1000 of the present disclosure has to be embedded in the helmet in accordance with the shape of the user's head, the easy adjustment of the overall shape may be a great advantage.

In the second embodiment of the adsorption filter structure 1000 shown in FIG. 9, the shielding layer 140 may be stacked in the internal space of the filtration unit 100 so as to be in surface contact with each end filtration layer 131, and the adsorption layer 120 may be filled in the internal space of the filtration unit 100 excluding the end filtration layer 131 and the shielding layer 140. In more detail, the volume of the adsorption layer 120 filled in the internal space of the filtration unit 100 is maximized, so that the time for external air to stay in the adsorption layer 120 may be increased. In addition, the shielding layer 140 is included in both ends of the adsorption layer 120, which may reduce the flow rate of air flowing into and discharged from the adsorption layer 120, thereby increasing the time for external air to stay in the adsorption layer 120. Therefore, the adsorption efficiency may be maximized.

The second embodiment of the adsorption filter structure 1000 has an advantage in that it is easy to manufacture the adsorption filter structure 1000 due to a simple internal structure compared to the other embodiments, and it is easy to adjust the overall shape of the filtration unit 100. That is, the adsorption filter structure 1000 may be manufactured only by designing the shape of the adsorption layer 120 filled therein in accordance with a pre-designed sample. Because the adsorption filter structure 1000 of the present disclosure has to be embedded in the helmet in accordance with the shape of the user's head, the easy adjustment of the overall shape may be a great advantage.

The third embodiment of the adsorption filter structure 1000 shown in FIG. 10 may be a structure in which the shielding layer 140 is stacked in the internal space of the filtration unit 100 so as to be in surface contact with each end filtration layer 131, the adsorption layer 120 and the filtration layer 130 are alternately stacked in the internal space of the filtration unit 100 excluding the end filtration layer 131 and the shielding layer 140 vertically to the filtration direction, and the shielding layer 140 corresponds to a part in contact with the filtration layer 130 and a hole is formed. At this time, a position of the hole formed in the shielding layer 140 is changeable according to an application of the user. According to the position of the hole formed in the shielding layer 140, the flow of external air may be changed.

Owing to the above structure, the external air injected into the filtration unit 100 may firstly pass through the end filtration layer 131, pass through the filtration layer 130 through the hole of the shielding layer 140, and flow in the filtration direction. Thereafter, the external air may diffuse into the adsorption layer 120 stacked in contact with the filtration layer 130 to adsorb the toxic gas. Finally, the external air may be diffused again from the adsorption layer 120 to the filtration layer 130 and discharged to the internal vent 300 through the hole formed in the shielding layer 140.

In the third embodiment of the adsorption filter structure 1000, it is possible to more reliably filter fine foreign substances contained in the external air by allowing the external air to pass through the filtration layer 130 several times, and it is possible to increase the time for the external air to stay in the adsorption layer 120 by allowing the external air to pass through the adsorption layer 120 and the filtration layer 130 several times. This has the advantage of maximizing the adsorption efficiency.

Figure 11:
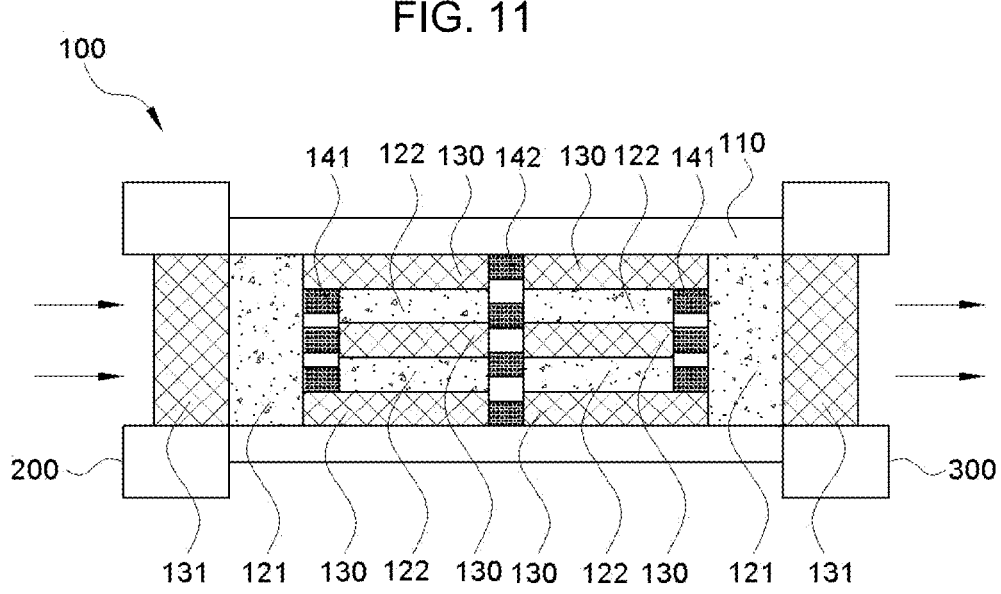
FIG. 11 is a cross-sectional view illustrating a fourth embodiment of the filtration unit.

The fourth embodiment of the adsorption filter structure 1000 shown in FIG. 11 may be a structure in which a first adsorption layer 121 is stacked in the internal space of the filtration unit 100 so as to be in surface contact with each end filtration layer 131, a first shielding layer 141 is stacked so as to be in surface contact with each first adsorption layer 121, a second adsorption layer 122 and the filtration layer 130 are alternately stacked in the internal space of the filtration unit 100 excluding the end filtration layer 131, the first adsorption layer 121, and the first shielding layer 141 vertically to the filtration direction, and the filtration layer 130 are alternately stacked, and a second shielding layer 142 in a direction parallel to the first shielding layer 141 is stacked at least one layer so as to vertically penetrate the second adsorption layer 122 and the filtration layer 130.

Owing to the above structure, the external air injected into the filtration unit 100 may firstly pass through the end filtration layer 131, and then pass through the first adsorption layer 121 to primarily adsorb the toxic gas. In this regard, the first shielding layer 141 is stacked to be in contact with the first adsorption layer 121, so that the time for the external air to stay in the first adsorption layer 121 may be increased. Thereafter, the external air may pass through the filtration layer 130 through the hole of the first shielding layer 141 and flow in the filtration direction, and diffuse into the second adsorption layer 122 stacked in contact with the filtration layer 130 to secondarily adsorb the toxic gas, etc. At this time, a plurality of second shielding layers 142 vertically penetrating through the filtration layer 130 and the second adsorption layer 122 are disposed so that the external air reciprocates between the filtration layer 130 and the second adsorption layer 122 multiple times, and filtration and adsorption may be performed. Finally, the external air may be diffused again from the adsorption layer 120 to the filtration layer 130 and discharged to the internal vent 300 through the hole formed in the shielding layer 140.

In the fourth embodiment of the adsorption filter structure 1000, the adsorption layer 120, the filtration layer 130, and the shielding layer 140 are designed more complicatedly than the other embodiments, which may allow the external air to repeatedly move the adsorption layer 120 and the filtration layer 130, thereby increasing filtration and adsorption efficiency of the external air compared to the size of the space. Accordingly, it is possible to more reliably filter fine foreign substances contained in the external air, increase the time for the external air to stay in the adsorption layer 120 by allowing the external air to pass through the adsorption layer 120 and the filtration layer 130 several times, thereby maximizing the adsorption efficiency. In addition, the adsorption filter structure 1000 is not limited to the shape shown in FIGS. 6A and 6B, and a shape designed to allow the external air to reciprocate between the filtration layer 130 and the adsorption layer 120 three or more times, and controlling the flow of the external air by inserting the shielding layer 140 therebetween may be included in the scope of the fourth embodiment of the adsorption filter structure 1000.

The fifth embodiment of the adsorption filter structure 1000 shown in FIG. 12 may be a structure in which an adsorption-filtration composite layer 150 in which the adsorption layer 120 and the filtration layer 130 are mixed is filled in the internal space of the filtration unit 100. In more detail, the adsorption-filtration composite layer 150 may be in the form that the adsorption layer 120 is inserted between spaces of the filtration layer 130 through which the air passes. At this time, a filter having a lower filtration efficiency may be selected for the filtration layer 130 than that of the filtration layer 130 applied in the other embodiments in order to secure a space in which the adsorption layer 120 is input. Additionally, in order to increase the adsorption and filtration efficiency of the adsorption-filtration composite layer 150, the shielding layer 140 may be further inserted in the middle of the filtration direction.

The fifth embodiment of the adsorption filter structure 1000 has an advantage in that it is easy to manufacture the adsorption filter structure 1000 because the internal structure is simple compared to the other embodiments, and it is easy to adjust the overall shape of the filtration unit 100. That is, the adsorption filter structure 1000 may be manufactured only by designing the shape of the adsorption-filtration composite layer 150 filled therein in accordance with a pre-designed sample. Because the adsorption filter structure 1000 of the present disclosure has to be embedded in the helmet in accordance with the shape of the user's head, the easy adjustment of the overall shape may be a great advantage.

The sixth embodiment of the adsorption filter structure 1000 shown in FIG. 13 may be a structure in which the adsorption layer 120 and the filtration layer 130 are alternately stacked in the internal space of the filtration unit 100 vertically to the filtration direction, a plurality of filtration layers 130 in the shape of membrane in which a plurality of wrinkles are formed vertically to the filtration direction are stacked, and the adsorption layer 120 is filled between each filtration layer 130. In this regard, a gap between the membranes in which the wrinkles forming the filtration layer 130 are formed may be wider than that of the filtration layer 130 applied in the other embodiments in order to secure a space in which the adsorption layer 120 is input. Additionally, in order to increase the adsorption and filtration efficiency of the adsorption-filtration composite layer 150, the shielding layer 140 may be further inserted in the middle of the filtration direction.

The sixth embodiment of the adsorption filter structure 1000 may replace the filtration layer 130 with a plurality of corrugated membranes and fill the adsorption layer 120 therebetween, which may increase an area in which the external air contacts the adsorption layer 12, thereby increasing the adsorption efficiency. In addition, the wrinkles are formed in the filtration layer 130 and the adsorption layer 120, and thus the time for the external air to stay in the adsorption layer 120 may be increased. This has the advantage of maximizing the adsorption efficiency.

The seventh embodiment of the adsorption filter structure 1000 shown in FIG. 14 may be a structure in which the adsorption layer 120 and the filtration layer 130 are alternately stacked in the internal space of the filtration unit 100 vertically to the filtration direction, a plurality of filtration layers 130 in the shape of membrane in which a plurality of wrinkles are formed vertically to the filtration direction are stacked, and the adsorption layer 120 is filled between each filtration layer 130. In this regard, a gap between the membranes in which the wrinkles forming the filtration layer 130 are formed may be wider than that of the filtration layer 130 applied in the other embodiments in order to secure a space in which the adsorption layer 120 is input. Additionally, in order to increase the adsorption and filtration efficiency of the adsorption-filtration composite layer 150, the shielding layer 140 may be further inserted in the middle of the filtration direction.

The seventh embodiment of the adsorption filter structure 1000 may replace the filtration layer 130 with a plurality of corrugated membranes and fill the adsorption layer 120 therebetween, which may increase an area in which the external air contacts the adsorption layer 12, thereby increasing the adsorption efficiency. In addition, the wrinkles are formed in the filtration layer 130 and the adsorption layer 120, and thus the time for the external air to stay in the adsorption layer 120 may be increased. This has the advantage of maximizing the adsorption efficiency.

DESCRIPTION OF REFERENCE NUMERALS

1000: adsorption filter structure
100: filtration unit
110: case unit
120: adsorption layer
121: first adsorption layer
122: second adsorption layer
130: filtration layer
131: end filtration layer
140: shielding layer
141: first shielding layer
142: second shielding layer
150: adsorption-filtration composite layer
160: first end portion
161: second hole
170: second end portion
180: connection unit
200: external vent
300: internal vent

400: powered air purifying respirator (PAPR)
410: blowing fan
500: slide unit
510: first guide
520: second guide
521: inlet
530: third guide
531: outlet
2000: helmet to which adsorption filter structure is applied
2100: protection unit
2200: neck packing unit
2300: nose cast
2310: hose
2400: exhalation port
2500: external air entrance hole
2600: pollution detection sensor
2700: remaining life indicator
2800: respiration volume detection sensor

What is claimed is:

1. An adsorption filter structure comprising:
a filtration unit including an internal space, passing external air through the internal space in a filtration direction, and filtering the external air;
an external vent communicatively connected to the internal space of the filtration unit, coupled to one side of the filtration unit, and receiving the external air; and
an internal vent communicatively connected to the internal space of the filtration unit, coupled to the other side of the filtration unit, and supplying the external air filtered by the internal space of the filtration unit;
wherein the filtration unit comprises:
at least one adsorption layer of a predetermined thickness that adsorbs a contaminant of a case unit; and
at least one filtration layer of a predetermined thickness that filters the contaminant; wherein the filtration unit further comprises a respective end filtration layer stacked on each of two opposite ends of the filtration unit; and wherein each of the end filtrations layers having a predetermined thickness; wherein the filtration unit further comprises, in the internal space of the filtration unit, a plate-shaped shielding layer in which a hole is formed;
wherein, in the internal space of the filtration unit, the shielding layer is stacked so as to be in surface contact with each of the end filtration layers, the adsorption layer and the filtration layer are alternately stacked vertically to the filtration direction in the internal space of the filtration unit excluding the end filtration layers and the shielding layer, and the shielding layer corresponds to a part in contact with the filtration layer so that the hole is formed.

2. The adsorption filter structure of claim 1, wherein the external vent and the internal vent are detachably coupled to the filtration unit.

3. The adsorption filter structure of claim 1, wherein the external vent and the internal vent are coupled to each other so that the internal space of the filtration unit is opened in the filtration direction.

4. An adsorption filter structure comprising:
a filtration unit including an internal space, passing external air through the internal space in a filtration direction, and filtering the external air;
an external vent communicatively connected to the internal space of the filtration unit, coupled to one side of the filtration unit, and receiving the external air; and an internal vent communicatively connected to the internal space of the filtration unit, coupled to the other side of the filtration unit, and supplying the external air filtered by the internal space of the filtration unit;

wherein the filtration unit comprises:

at least one adsorption layer of a predetermined thickness that adsorbs a contaminant of a case unit; and at least one filtration layer of a predetermined thickness that filters the contaminant; wherein the filtration unit further comprises a respective end filtration layer stacked on each of two opposite ends of the filtration unit; and wherein each of the end filtrations layers having a predetermined thickness; wherein the filtration unit further comprises, in the internal space of the filtration unit, a plate-shaped shielding layer in which a hole is formed;

wherein, in the internal space of the filtration unit, a first adsorption layer is stacked so as to be in surface contact with each of the end filtration layers, a first shielding layer is stacked so as to be in surface contact with each of the first adsorption layers, a second adsorption layer and the filtration layer are alternately stacked vertically to the filtration direction in the internal space of the filtration unit excluding the end filtration layers, the first adsorption layer, and the first shielding layer, and at least one second shielding layer in a direction parallel to the first shielding layer is stacked so as to vertically penetrate the second adsorption layer and the filtration layer.

5. The adsorption filter structure of claim 4, wherein the external vent and the internal vent are detachably coupled to the filtration unit.

6. The adsorption filter structure of claim 4, wherein the external vent and the internal vent are coupled to each other so that the internal space of the filtration unit is opened in the filtration direction.

7. An adsorption filter structure comprising:

a filtration unit including an internal space, passing external air through the internal space in a filtration direction, and filtering the external air;

an external vent communicatively connected to the internal space of the filtration unit, coupled to one side of the filtration unit, and receiving the external air; and an internal vent communicatively connected to the internal space of the filtration unit, coupled to the other side of the filtration unit, and supplying the external air filtered by the internal space of the filtration unit;

wherein the filtration unit comprises:

at least one adsorption layer of a predetermined thickness that adsorbs a contaminant of a case unit; and at least one filtration layer of a predetermined thickness that filters the contaminant; wherein the filtration unit further comprises a respective end filtration layer stacked on each of two opposite ends of the filtration unit; and wherein each of the end filtrations layers having a predetermined thickness; wherein, in the internal space of the filtration unit, an adsorption-filtration composite layer in which the adsorption layer and the filtration layer are mixed is filled;

wherein, in the internal space of the filtration unit, the adsorption layer and the filtration layer are alternately stacked vertically to the filtration direction, and a plurality of filtration layers in a shape of membrane in which a plurality of wrinkles are formed vertically to the filtration direction are stacked, and the adsorption layer is filled between each of the filtration layers.

8. The adsorption filter structure of claim 7, wherein the external vent and the internal vent are detachably coupled to the filtration unit.

9. The adsorption filter structure of claim 7, wherein the external vent and the internal vent are coupled to each other so that the internal space of the filtration unit is opened in the filtration direction.

10. An adsorption filter structure comprising:

a filtration unit including an internal space, passing external air through the internal space in a filtration direction, and filtering the external air;

an external vent communicatively connected to the internal space of the filtration unit, coupled to one side of the filtration unit, and receiving the external air; and an internal vent communicatively connected to the internal space of the filtration unit, coupled to the other side of the filtration unit, and supplying the external air filtered by the internal space of the filtration unit:

the filtration unit comprises:

at least one adsorption layer of a predetermined thickness that adsorbs a contaminant of a case unit; and at least one filtration layer of a predetermined thickness that filters the contaminant; wherein the filtration unit further comprises a respective end filtration layer stacked on each of two opposite ends of the filtration unit; and wherein each of the end filtrations layers having a predetermined thickness; wherein, in the internal space of the filtration unit, an adsorption-filtration composite layer in which the adsorption layer and the filtration layer are mixed is filled;

wherein, in the internal space of the filtration unit, the adsorption layer and the filtration layer are alternately stacked horizontally to the filtration direction, and the plurality of filtration layers in a shape of membrane in which a plurality of wrinkles are formed horizontally to the filtration direction are stacked, and the adsorption layer is filled between each of the filtration layers.

11. The adsorption filter structure of claim 10, wherein the external vent and the internal vent are detachably coupled to the filtration unit.

12. The adsorption filter structure of claim 10, wherein the external vent and the internal vent are coupled to each other so that the internal space of the filtration unit is opened in the filtration direction.

13. A purification module changing a flow direction of air to which an adsorption filter structure comprises, a filtration unit including an internal space, passing external air through the internal space in a filtration direction, and filtering the external air;

an external vent communicatively connected to the internal space of the filtration unit, coupled to one side of the filtration unit, and receiving the external air; and an internal vent communicatively connected to the internal space of the filtration unit, coupled to the other side of the filtration unit, and supplying the air filtered by the internal space of the filtration unit;

the purification module comprising:

a case unit including a distal portion and a proximal portion extending to one side, and in which a flow path is formed between the distal portion and the proximal portion; and a slide unit disposed inside the case unit and sliding in a longitudinal direction of the case unit, wherein the case unit includes a first end portion disposed on one side of the case unit, including the external vent in the distal portion, and in which a second hole is formed in the proximal portion;

a second end portion disposed on the other side of the case unit and including the internal vent in the proximal portion; and a connection unit connecting the first end portion and the second end portion, wherein the slide unit includes a first guide opening and closing the second hole by sliding inside the first end portion; and a second guide extending from the first guide in the longitudinal direction of the case unit and sliding inside the connection unit, and wherein the second guide includes an inlet (i) communicatively connected to the external vent and opened by sliding in a direction toward the first end portion, and (ii) recessed into the connection unit and closed by sliding in a direction toward the second end portion, and the slide unit is capable of varying the flow path by sliding.

14. The purification module of claim 13, wherein the slide unit further comprises:

a third guide connected to the second guide and opening and closing the internal vent by sliding inside the second end portion.

15. The purification module of claim 14, wherein the third guide includes an outlet communicatively connected to the internal vent and opened by sliding in the direction toward the first end portion, and closed by an inner wall of the second end portion by sliding in a direction away from the first end portion.

16. The purification module of claim 13, wherein the adsorption filter structure is disposed on one side of the case unit and is communicatively connected to the flow path of the case unit to filter the external air.

17. The purification module of claim 16, wherein as the flow path varies, the flow path is formed to pass through the adsorption filter structure or not to pass through the adsorption filter structure.

18. The purification module of claim 16, wherein the adsorption filter structure is detachably attached to the case unit.

19. The purification module of claim 16, wherein the case unit is coupled to both ends of the adsorption filter structure.

20. The purification module of claim 19, wherein the case unit further comprises:

a sealing member provided on a surface of the case unit in contact with the adsorption filter structure to prevent air from escaping.

21. The purification module of claim 13, further comprising:

a sliding driving unit driving the slide unit to slide in the longitudinal direction of the case unit.

*   *   *   *   *